United States Patent
Ohashi et al.

(10) Patent No.: US 8,675,098 B2
(45) Date of Patent: Mar. 18, 2014

(54) IMAGE PROCESSING DEVICE, IMAGE PROCESSING METHOD, AND PROGRAM

(75) Inventors: Takeshi Ohashi, Kanagawa (JP); Naoyuki Onoe, Kanagawa (JP); Asako Honjo, Tokyo (JP)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 12/715,434

(22) Filed: Mar. 2, 2010

(65) Prior Publication Data

US 2010/0245612 A1 Sep. 30, 2010

(30) Foreign Application Priority Data

Mar. 25, 2009 (JP) ................ P2009-073142

(51) Int. Cl.
*H04N 5/262* (2006.01)
*H04N 5/225* (2006.01)
*H04N 5/228* (2006.01)
*H04N 5/217* (2011.01)
*H04N 5/222* (2006.01)
*G06K 9/00* (2006.01)
*G06K 9/40* (2006.01)

(52) U.S. Cl.
USPC ........ 348/239; 348/169; 348/222.1; 348/241; 348/333.12; 382/103; 382/255

(58) Field of Classification Search
USPC ........ 348/61, 143–160, 169–172, 222.1, 239, 348/241, 333.01–333.12; 382/103, 382/190–208, 254–275; 396/153
See application file for complete search history.

(56) References Cited

U.S. PATENT DOCUMENTS

| | | | | |
|---|---|---|---|---|
| 7,106,376 | B1 * | 9/2006 | Anderson | 348/345 |
| 2002/0140823 | A1 * | 10/2002 | Sakurai et al. | 348/207.99 |
| 2003/0071905 | A1 * | 4/2003 | Yamasaki | 348/239 |
| 2003/0071908 | A1 * | 4/2003 | Sannoh et al. | 348/345 |
| 2004/0207743 | A1 * | 10/2004 | Nozaki et al. | 348/333.12 |
| 2005/0008246 | A1 * | 1/2005 | Kinjo | 382/254 |
| 2005/0129324 | A1 * | 6/2005 | Lemke | 382/254 |
| 2006/0210264 | A1 * | 9/2006 | Saga | 396/287 |
| 2007/0025722 | A1 * | 2/2007 | Matsugu et al. | 396/263 |
| 2007/0110422 | A1 * | 5/2007 | Minato et al. | 396/89 |
| 2007/0195171 | A1 * | 8/2007 | Xiao et al. | 348/207.99 |
| 2007/0274703 | A1 * | 11/2007 | Matsuda | 396/264 |
| 2007/0286589 | A1 * | 12/2007 | Ishiwata et al. | 396/125 |

(Continued)

FOREIGN PATENT DOCUMENTS

| | | |
|---|---|---|
| JP | 11-4377 | 1/1999 |
| JP | 2004-320285 | 11/2004 |
| JP | 2007-226346 | 9/2007 |

OTHER PUBLICATIONS

Dalal, et al., "Histograms of Oriented Gradients for Human Detection", CVPR2005, pp. 1-8, (2005).

(Continued)

*Primary Examiner* — Michael Osinski
(74) *Attorney, Agent, or Firm* — Finnegan, Henderson, Farabow, Garrett & Dunner, LLP

(57) ABSTRACT

An image processing device includes: a determination unit determining whether each character included as a subject in a captured image is an unnoted non-main character; and a controller controlling an image-related process which is a process related to an image on the basis of a status of the character determined as a non-main character.

14 Claims, 21 Drawing Sheets

(56) References Cited

U.S. PATENT DOCUMENTS

| | | | |
|---|---|---|---|
| 2008/0024616 A1* | 1/2008 | Takahashi | 348/221.1 |
| 2008/0025710 A1* | 1/2008 | Sugimoto | 396/48 |
| 2008/0106615 A1* | 5/2008 | Ahonen et al. | 348/231.99 |
| 2008/0181506 A1* | 7/2008 | Nishizawa | 382/190 |
| 2008/0273097 A1* | 11/2008 | Nagashima | 348/231.99 |
| 2009/0021600 A1* | 1/2009 | Watanabe | 348/222.1 |
| 2009/0041445 A1* | 2/2009 | Yoshida et al. | 396/121 |
| 2009/0066803 A1* | 3/2009 | Miyata | 348/222.1 |
| 2009/0109304 A1* | 4/2009 | Guan | 348/240.99 |
| 2010/0086175 A1* | 4/2010 | Yokono et al. | 382/103 |
| 2010/0149210 A1* | 6/2010 | Matsunaga et al. | 345/625 |
| 2010/0225773 A1* | 9/2010 | Lee | 348/222.1 |
| 2011/0103644 A1* | 5/2011 | Garten | 382/103 |
| 2012/0051594 A1* | 3/2012 | Kim et al. | 382/103 |

OTHER PUBLICATIONS

Mikolajczyk, et al., "Human detection based on a probabilistic assembly of robust part detectors", Proc. ECCV, 1:69.81, pp. 1-13, (2004).

\* cited by examiner

IMAGE PROCESSING DEVICE, IMAGE PROCESSING METHOD, AND PROGRAM

BACKGROUND OF THE INVENTION

1. Field of the Invention

The present invention relates to an image processing device, an image processing method, and a program, and more particularly, to an image processing device, an image processing method, and a program, which can make a control of processes on the basis of statuses of unnoted non-main characters.

2. Description of the Related Art

Various techniques to be applied to devices treating images of a digital camera and the like have been suggested which can acquire more desirable images by specifying a character to be captured by a photographer and bringing the specified character into focus or controlling a zoom lens.

For example, Japanese Unexamined Patent Application Publication No. 2007-226346 discloses a technique of distinguishing a non-desired character from a character desired as a subject by a user on the basis of a face size.

Japanese Unexamined Patent Application Publication No. 11-4377 discloses a technique of repeatedly capturing an image with the same composition and specifying a character continuously included therein. It also discloses a technique of removing a moving passer-by or the like other than a specified subject by image synthesis.

Japanese Unexamined Patent Application Publication No. 2004-320285 discloses a technique of selecting an optimal color parameter or outline-emphasizing parameter or an aperture value on the basis of the number or size of characters extracted from an image. When plural faces are detected, it is also disclosed what face should be used to control the focusing or exposure.

SUMMARY OF THE INVENTION

According to the above-mentioned techniques, a main character can be captured by properly setting the focus, the aperture, the hue, the face direction or sight line, the position, and the size, but a non-main character other than the main character may be captured in the proper state.

For example, when a main character and a non-main character are close to each other, the non-main character may be captured in the same proper state as the main character.

It is desirable to control processes on the basis of a status of an unnoted non-main character.

According to an embodiment of the invention, there is provided an image processing device including: a determination unit determining whether each character included as a subject in a captured image is an unnoted non-main character; and a controller controlling an image-related process which is a process related to an image on the basis of a status of the character determined as a non-main character.

The image processing device may further include image capturing means. In this case, the determination means may determine whether each character included as a subject in the image captured by the image capturing means is an unnoted non-main character, and the control means may control a process of capturing an image to be recorded, which is performed as the image-related process by the image capturing means.

The image processing device may further include: image capturing means; and image processing means for processing the image captured by the image capturing means. In this case, the determination means may determine whether each character included as a subject in the image captured by the image capturing means is an unnoted non-main character, and the control means may control a process of processing a part of the character determined as a non-main character included in the image captured by the image capturing means, which is performed as the image-related process by the image processing means.

The image processing device may further include: recording means for recording the captured image; and display control means for controlling a display of the image recorded in the recording means. In this case, the determination means may determine whether each character included as a subject in the image recorded in the recording means is an unnoted non-main character, and the control means may control a process of displaying the image including the character determined as a non-main character, which is performed as the image-related process by the display control means.

The image processing device may further include detection means for analyzing the captured image to acquire information on a position of at least one of a face and a body of each character included as a subject. In this case, the determination means may determine that a character included at a position other than the vicinity of the center of the image is a non-main character on the basis of the information on the position acquired by the detection means.

The determination means may determine that a character moving by a distance greater than a threshold value is a non-main character on the basis of the information on the position acquired by the detection means from a plurality of the images continuously captured.

The determination means may determine that a character not included continuously for a predetermined time is a non-main character on the basis of the information on the position acquired by the detection means from a plurality of the images continuously captured.

The image processing device may further include detection means for analyzing the captured image to acquire information on a size of at least one of a face and a body of each character included as a subject. In this case, the determination means may determine that a character with a size smaller than a threshold value is a non-main character on the basis of the information on the size acquired by the detection means.

The image processing device may further include detection means for analyzing the captured image to acquire information on a direction of at least one of a face and a body of each character included as a subject. In this case, the determination means may determine that a character of which a face or a body is not directed to an image capturing device for a predetermined time is a non-main character on the basis of the information on the direction acquired by the detection means from a plurality of the images continuously captured.

The image processing device may further include: detection means for analyzing the captured image to acquire a face of each character included as a subject; and recognition means for recognizing whether the expression of the face detected by the detection means is a smile. In this case, the determination means may determine that a character which does not hold a smile continuously for a predetermined time is a non-main character on the basis of the recognition result of the recognition means from a plurality of the images continuously captured.

The image processing device may further include: recording means for recording a face image; and detection means for analyzing the captured image to acquire a face image of each character included as a subject. In this case, the determination means may determine that a character of which the face image is not recorded in the recording means out of the characters included in a subject is a non-main character.

The image processing device may further include display means for displaying the captured image. In this case, the determination means may determine that a character which is not specified by a user out of the characters included in a subject in the image displayed by the display means is a non-main character.

According to another embodiment of the invention, there is provided an image processing method including the steps of: determining whether each character included as a subject in a captured image is an unnoted non-main character; and controlling an image-related process which is a process related to an image on the basis of a status of the character determined as a non-main character.

According to still another embodiment of the invention, there is provided a program causing a computer to perform an image processing method including the steps of: determining whether each character included as a subject in a captured image is an unnoted non-main character; and controlling an image-related process which is a process related to an image on the basis of a status of the character determined as a non-main character.

According to the embodiments of the invention, it is determined whether each character included as a subject in a captured image is an unnoted non-main character, and the image-related process which is a process related to an image is controlled on the basis of a status of the character determined as a non-main character.

According to the embodiments of the invention, it is possible to control processes on the basis of a status of an unnoted non-main character.

DESCRIPTION OF THE PREFERRED EMBODIMENTS

Configuration and Operation of Image Processing Device

Figure 1:
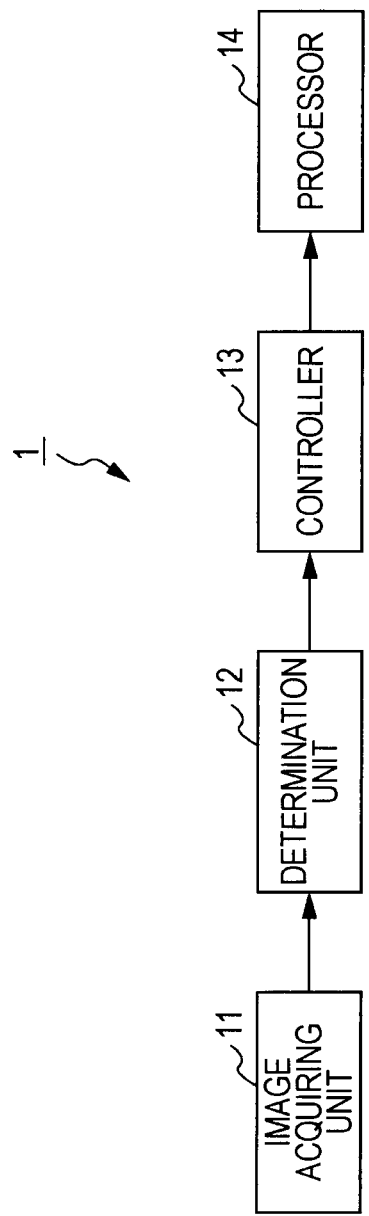
FIG. 1 is a block diagram illustrating the configuration of an image processing device according to an embodiment of the invention.

FIG. 1 is a block diagram illustrating a configuration of an image processing device 1 according to an embodiment of the invention.

The image processing device 1 shown in FIG. 1 includes an image acquiring unit 11, a determination unit 12, a controller 13, and a processor 14. The image processing device 1 having this configuration is applied to an apparatus such as a digital camera, as described later.

The image acquiring unit 11 acquires a captured image. An image captured directly by an image capturing device such as a CCD (Charge Coupled Device) or an image captured and recorded on a recording medium such as a memory card is acquired by the image acquiring unit 11. The image acquiring unit 11 outputs the acquired image to the determination unit 12.

The determination unit 12 analyzes the image supplied from the image acquiring unit 11 and determines whether a character included as a subject in the image is a main character noted by a user which is a photographer of the image or an unnoted non-main character.

When plural characters are included in one image, it is determined for each character whether it is a main character or a non-main character. The determination on whether a character is a main character or a non-main character is referred to as main and non-main character determination.

The determination unit 12 detects the sizes, the positions, and the directions of the faces or the sizes and the positions of the bodies of the characters included as a subject and recognizes the statuses of the faces or bodies of which the positions and the like are detected. For example, the determination unit 12 recognizes the expression or sight line of a face as the face status and recognizes the posture as a body status.

The determination unit 12 outputs the detected information of the faces or bodies and the recognized information of the statuses of the faces or bodies to the controller 13 along with the result information of the main and non-main character determination.

The controller 13 detects the status of a non-main character on the basis of the information supplied from the determination unit 12. The controller 13 controls an image-related process as a process related to an image, which is performed by the processor 14, on the basis of the status of the non-main character.

For example, when a non-main character is included marked and the image processing device 1 is applied to an image capturing device such as a digital camera, the controller 13 sets a shutter button to a locked state, that is, controls the shutter button to be pressed, whereby the process of acquiring an image is not performed.

When a non-main character is included marked and the image processing device 1 is applied to an image capturing device such as a digital camera, the controller 13 performs a process of processing an image such a process of gradating a part of the non-main character included in the image to be recorded.

When a user instructs to display a captured image, the controller 13 does not select the image in which a non-main character is marked out of the instructed images as an image to be displayed, but selects and displays only an image in which a non-main character is not marked.

In this example, the image-related process includes an image acquiring process, an image processing process, and an image displaying process. In addition, the image-related process includes various processes related to an image such as an image transmitting process, an image receiving process, and a recorded image deleting process.

The processor 14 performs the image-related process under the control of the controller 13.

Figure 2:
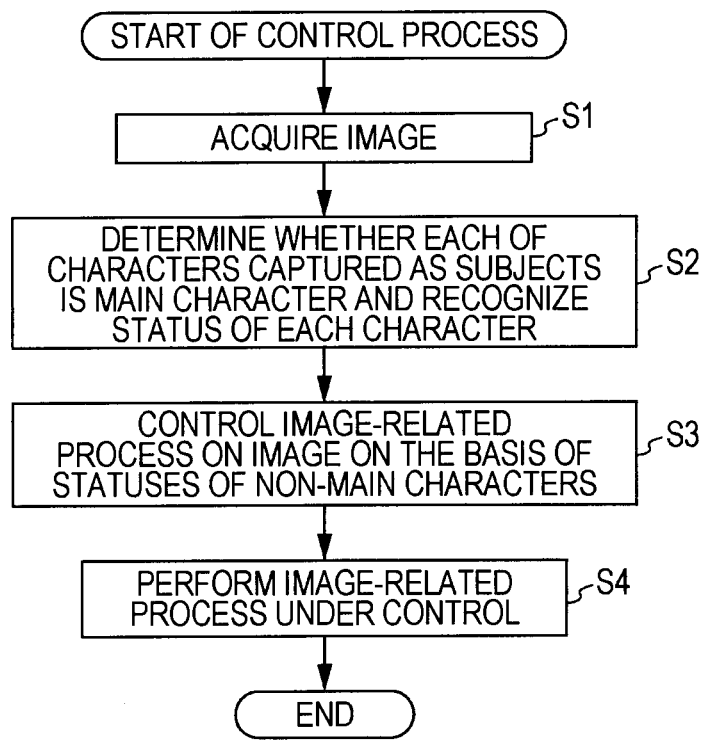
FIG. 2 is a flowchart illustrating a control process of the image processing device.

Here, a control process performed by the image processing device 1 shown in FIG. 1 will be described with reference to the flowchart shown in FIG. 2.

In step S1, the image acquiring unit 11 acquires a captured image.

In step S2, the determination unit 12 determines whether each character included as a subject in the image acquired by the image acquiring unit 11 is a main character or a non-main character. The determination unit 12 detects the size, the position, and the direction of the face or the size and the position of the body of each character and recognizes the status of the face or body of which the position and the like are detected.

In step S3, the controller 13 controls the image-related process on the basis of the status of a non-main character.

In step S4, the processor 14 performs the image-related process under the control of the controller 13.

In this way, various processes in the image processing device 1 are controlled on the basis of the status of a non-main character, not the status of a main character.

For example, by locking the shutter button so as not to capture an image when a non-main character is marked, it is possible to prevent the capturing of an image in which a non-main character as well as a main character is marked.

When a main character is noted and an image is captured in which the main character is marked, an image may be captured in which the main character and a non-main character are equally marked, but such a problem can be prevented.

Since the processes are controlled on the basis of the status of a non-main character, only the determination on whether a character is a non-main character is carried out as the main and non-main character determination on whether a character is a main character or a non-main character. In this case, information indicating what character included in the image is a non-main character is supplied from the determination unit 12 to the controller 13 as information of the determination result.

Configuration of Determination Unit

Figure 3:
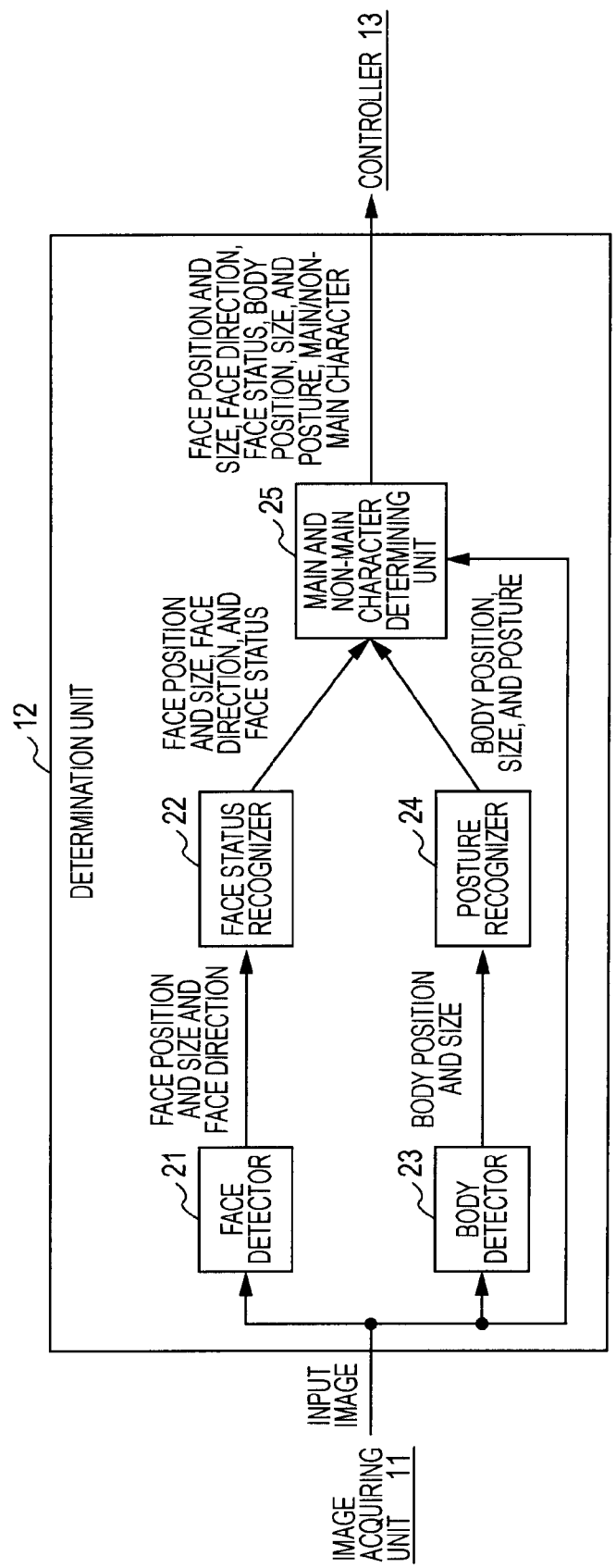
FIG. 3 is a block diagram illustrating a configuration of a determination unit shown in FIG. 1.

FIG. 3 is a block diagram illustrating the configuration of the determination unit 12 shown in FIG. 1.

As shown in FIG. 3, the determination unit 12 includes a face detector 21, a face shape recognizer 22, a body detector 23, a posture recognizer 24, and a main and non-main character determining unit 25. The image output from the image acquiring unit 11 is input to the face detector 21, the body detector 23, and the main and non-main determining unit 25.

The face detector 21 detects faces included in the input image and acquires the positions, sizes, and directions of the faces in the image. The face direction is expressed by a roll angle, a pitch angle, and a yaw angle.

The technique of detecting the faces from an image and detecting the positions, sizes, and directions of the faces is described, for example, in Japanese Unexamined Patent Application Publication No. 2007-249852.

In the technique of the publication, the processes of scanning a target image while sequentially shifting a constant-size window pixel by pixel in the raster order and acquiring a cutout image which is an image in the window are repeatedly performed while sequentially reducing the size of the target image. By detecting whether a subject included in each cutout image is a face and inputting a difference in brightness between two pixels in a start image to a discriminator using an algorithm such as AdaBoost, it is possible to discriminate to what side the face is directed.

In the discriminator, the difference in brightness between two pixels is input thereto, an estimated value is calculated by plural sub discriminators, and it is determined to what side the face is directed on the basis of the weighted and estimated value obtained by multiplying the estimated value by a weight obtained by learning.

The face detector 21 outputs information of the center position of the window (rectangular region) from which the face is detected along with the detected face image as the position information of the face and outputs the area of the rectangular region as the size information of the face. The face detector 21 outputs, as the direction information of the face, information having a certain range such as −45 to −15, −15 to +15, and +15 to +45 in the yaw direction. The information output from the face detector 21 is supplied to the face shape recognizer 22.

The detection of the face position and the like may be carried out by the technique described in Japanese Unexamined Patent Application Publication No. 2005-284487. In addition, the technique described in "Learning of Real-Time Posture and Face Detector Using Pixel Difference Feature", written by Kohtaro Sabe and Kenichi Hidai, Lectures of $10^{th}$ Image Sensing Symposium, pp. 547-552, 2004 may be used.

The face shape recognizer 22 recognizes the statuses of the faces of which the positions and the like are detected by the face detector 21. For example, by comparing a face status with information prepared in advance by learning, the direction of the sight line and the smile as the face expression are recognized as the face status. The face shape recognizer 22 outputs information indicating the recognized face statuses to the main and non-main determining unit 25 along with the information supplied from the face detector 21.

The body detector 23 detects bodies included in the input image and acquires the body positions and sizes in the image.

A technique of detecting a body from an image and detecting a body direction and a body size is described, for example, in "Human detection based on a probabilistic assembly of robust part detectors", written by K. Mikolajczyk, C. Schmid, and A. Zisserman, Proc. ECCV, 1:69.81, 2004.

In the technique, an outline feature quantity acquired by edge extraction is used as a main feature quantity for detecting (recognizing) a person from an image. The parts of the person's body are expressed by the outline feature quantities using the Gaussian derivatives.

The body detector 23 outputs information of the center position of a rectangular region surrounding the body along with the image of the detected body as the position information of the body and outputs the area of the rectangular region as the size information of the body. The information output from the body detector 23 is supplied to the posture recognizer 24.

The position of the body may be detected using a technique described in "Histograms of Oriented Gradients for Human Detection", written by Navneet Dalal and Bill Triggs, CVPR 2005, instead of the technique described in the above-mentioned document.

The posture recognizer 24 recognizes the statuses of the bodies of which the positions and the like are detected by the body detector 23. For example, in comparison with posture information prepared in advance, the posture is recognized. The technique of recognizing a posture by comparing information of a captured image with information prepared in advance is described, for example, in Japanese Unexamined Patent Application Publication No. 9-273920.

The posture recognizer 24 outputs the information indicating the recognized posture to the main and non-main character determining unit 25 along with the information supplied from the body detector 23.

The main and non-main determining unit 25 acquires the information on the face positions, sizes, and directions supplied from the face shape recognizer 22 and the information on the body positions and sizes supplied from the posture recognizer 24.

By causing the image acquiring unit 11 to repeatedly acquire an image and sequentially analyzing the acquired images, the information on the faces or bodies of the characters included in the images are acquired by the main and non-main character determining unit 25. The main and non-main character determining unit 25 also acquires the images output from the image acquiring unit 11.

The main and non-main character determining unit 25 performs the main and non-main character determining process on the respective characters included in the image acquired by the image acquiring unit 11 on the basis of the acquired information.

For example, the main and non-main character determining unit 25 performs the main and non-main character determining process by calculating scores based on the sizes of the faces and the bodies, scores based on the positions of the faces and the bodies, and scores using time information and synthesizing and using the calculated scores. The methods of calculating the scores will be sequentially described.

1. Scores Based on Sizes of Face and Body

The main and non-main character determining unit 25 calculates the score based on the face size and the score based on the body size so that the score becomes higher as the area becomes greater and the score becomes lower as the area becomes smaller.

For example, the main and non-main character determining unit 25 calculates the score based on the face size by dividing the area of the face by the total area of the image as expressed by Expression 1.

Expression 1

Score based on face size=face area/image area

The main and non-main character determining unit 25 calculates the score based on the body size by dividing the area of the body by the total area of the image as expressed by Expression 2.

Expression 2

Score based on body size=body area/image area

The scores calculated by the main and non-main character determining unit 25 are in the range of 0.0 to 1.0.

Figure 4:
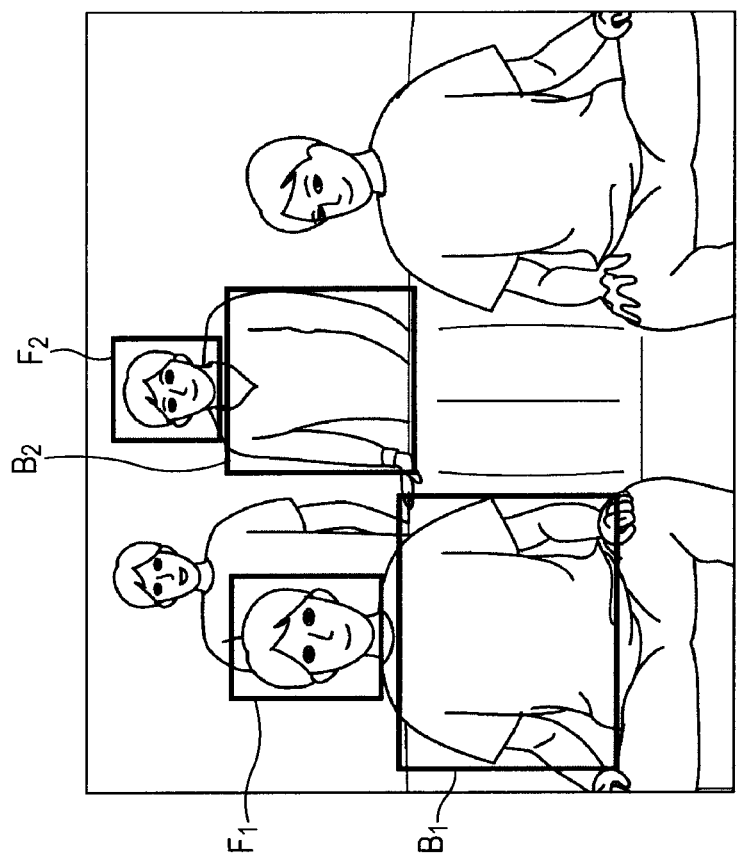
FIG. 4 is a diagram illustrating a score based on a face size and a body size.

FIG. 4 is a diagram illustrating the scores based on the sizes of the face and the body.

When an image in which two characters are arranged in the front line and two characters are arranged in the rear line is acquired as shown in FIG. 4, the face detector 21 and the body detector 22 detect the positions, areas, and the like of the faces and bodies of four characters. FIG. 4 shows an example where an upper half is detected as a body.

In this case, the face position of the front-left character is displayed at the center position of a frame $F_1$ and the face area is expressed by the area of the frame $F_1$. The body position of the front-left character is displayed at the center position of a frame $B_1$ and the body area is expressed by the area of the frame $B_1$.

Similarly, the face position of the rear-right character is displayed at the center position of a frame $F_2$ and the face area is expressed by the area of the frame $F_2$. The body position of the rear-right character is displayed at the center position of a frame $B_2$ and the body area is expressed by the area of the frame $B_2$.

In view of the areas, the score of the face size and the score of the body size of the front-left character are both higher than the scores of the rear-right character according to Expressions 1 and 2.

The main and non-main character determining unit 25 calculates the scores based on the face size and the body size of the front-right character and the rear-left character in the same way.

2. Score Based on Positions of Face and Body

Figure 5:
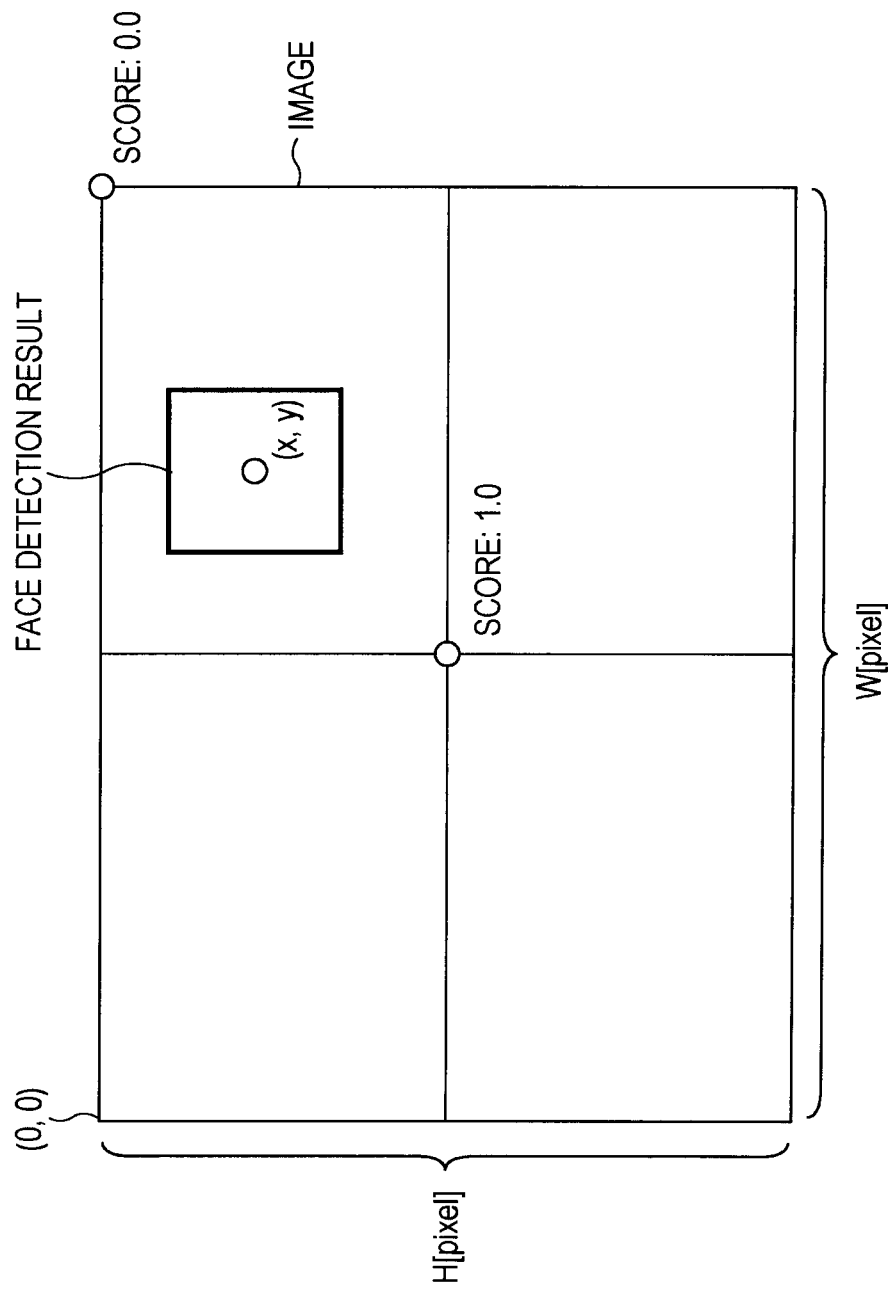
FIG. 5 is a diagram illustrating a score based on a face position.

FIG. 5 is a diagram illustrating the score based on the face position.

The main and non-main character determining unit 25 calculates the score so that the score becomes higher as the face position becomes closer to the center of the image and the score becomes lower as the face position becomes closer to the corner of the image.

For example, as shown in FIG. 5, when the width of the image is W [pixel], the height is H [pixel], and the face position represented by the center position of the rectangular region is (x, y) [pixel], the main and non-main character determining unit 25 calculates the score based on the face position by the use of Expression 3. In the example shown in FIG. 5, the origin of the coordinates representing the face position is set to the left-upper corner.

Expression 3

$$\text{(Score based on a position)} = 1 - \sqrt{\frac{\left(\frac{x}{W} - 0.5\right)^2 \times}{2 + \left(\frac{y}{H} - 0.5\right)^2}} \times 2 \quad (3)$$

The score calculated by the main and non-main character determining unit 25 is in the range of 0.0 to 1.0. The main and non-main character determining unit 25 similarly calculates the score based on the body position so that the score becomes higher as the face position becomes closer to the center of the image and the score becomes lower as the face position becomes closer to the corner of the image.

3. Score Using Time Information

The main and non-main character determining unit 25 calculates the score so that the score of a character in which the time that the character watches a camera, the time that the character stops the movement and takes a pose, the time that the character stays in the image, and the time that the character continuously holds a smile are longer becomes higher and the score of a character in which the times are shorter becomes lower. In this case, the analysis result on continuously captured images is used.

When the measuring time is s [sec] and the number of processed images per second (the number of input images to the determination unit 12) is f [sheets], sf images are processed for the measuring time.

The score based on the time that a character watches a camera is calculated by Expression 4.

Expression 4

$$(\text{Score based on the time that a character watches a camera}) = g/sf \quad (4)$$

Here, g represents the number of images in which the character watches the camera out of the sf images processed for the measuring time. It is determined whether an image is the image in which a character watches the camera on the basis of the face directions detected by the face detector 21. The scores calculated by the main and non-main character determining unit 25 are in the range of 0.0 to 1.0.

It may be determined whether an image is the image in which a character watches the camera on the basis of the sight lines recognized by the face shape recognizer 22.

Other scores are similarly calculated by Expression 4.

When the score based on the time that a character stops the movement and takes a pose is calculated, the main and non-main character determining unit 25 calculates differences in brightness between the pixels of the rectangular region surrounding a body in a certain frame and the pixels of the rectangular region surrounding the same body in the previous frame. The detection result of the body detector 23 is used to calculate the score based on the time that a character stops the movement and takes a pose.

The main and non-main character determining unit 25 calculates the sum of the differences in brightness, determines that the character does not move when the summed value is less than a threshold value, and applies the number of frames g in which the character does not move for s seconds to Expression 4, thereby calculating the score.

The score based on the time that a character stops the movement and takes a pose may be calculated by applying the number of frames g in which the same posture is continuously recognized to Expression 4 on the basis of the posture recognized by the posture recognizer 24.

When the score based on the time that a character stays in an image is calculated, the main and non-main character determining unit 25 calculates the score by applying the number of frames g in which the character is continuously detected to Expression 4. For example, an ID is given to the face detected by the face detector 21 or the body detected by the body detector 23 so as to track the positions of the face and body of the same character over plural frames.

When the score based on the time that a character continuously holds a smile is calculated, the main and non-main character determining unit 25 calculates the score by applying the number of frames g in which the character continuously holds a smile to Expression 4. The recognition result of the face shape recognizer 22 is used to calculate the score based on the time that a character continuously holds a smile.

Instead of using Expression 4, the scores may be calculated by setting a threshold value t [sheet], setting 1.0 when the number of images in which a target status is detected is greater than the threshold value for a predetermined time, and setting 0.0 when the number images is less than the threshold value. In this case, the score based on the time that a character watches the camera is expressed by Expression 5.

Expression 5

$$(\text{Score based on the time that a character watches a camera}) = \begin{cases} 0 & (g < t) \\ 1 & (t \leq g) \end{cases} \quad (5)$$

4. Method of Synthesizing Scores

The main and non-main character determining unit 25 synthesizes the scores calculated as described above.

When the number of scores to be synthesized is N and the scores are $S_i$ (where i=1, . . . , N), the score synthesized by an arithmetic average is expressed by Expression 6.

Expression 6

$$(\text{Score synthesized by arithmetic average}) = \frac{\sum_{i=1}^{N} S_i}{N} \quad (6)$$

The score synthesized by the geometrical mean is expressed by Expression 7.

Expression 7

$$(\text{Score synthesized by geometrical means}) = \sqrt[N]{\prod_{i=1}^{N} S_i} \quad (7)$$

The synthesized score is calculated for each character captured as a subject.

The main and non-main character determining unit 25 determines that a character of which the synthesized score is greater than a threshold value is a main character on the basis of the synthesized score and determines that a character of which the synthesized score is less than a threshold value is a non-main character.

The main and non-main character determining unit 25 outputs information on the determination result to the controller 13 along with the information supplied from the face shape recognizer 22 and the information supplied from the posture recognizer 24.

When it is determined whether a character is a main character or a non-main character, the main and non-main character determining unit 25 determines that the character having the score less than the threshold value is a non-main character. The threshold value used to determine the main character and the threshold value used to determine the non-main character may be different from each other.

Some scores may be used instead of all the scores calculated as the scores to be synthesized.

For example, when the determination of the non-main character is carried out on the basis of the score based on the face size and the body size, it is determined that the character of which the face size and the body size are less than the threshold value out of the characters captured as a subject is a non-main character.

When the determination of the non-main character is carried out on the basis of the score based on the face position and the body position, it is determined that the character of which the face and the body are located at positions other than the vicinity of a predetermined center is a non-main character.

When the determination of the non-main character is carried out on the basis of the score based on the time that a character watches the camera, it is determined that the character of which the face or the body is not directed to the camera for a predetermined time is a non-main character.

When the determination of the non-main character is carried out on the basis of the score based on the time that a character stops the movement and takes a pose, it is determined that the character who does not stop the movement (the position of the face or body) for a predetermined time is a non-main character.

When the determination of the non-main character is carried out on the basis of the score based on the time that a character stays in an image, it is determined that the character who does not stay in the image for a predetermined time is a non-main character.

Similarly, when the determination of the non-main character is carried out on the basis of the score based on the time that a character continuously holds a smile, it is determined that the character who does not hold a smile for a predetermined time is a non-main character.

MODIFIED EXAMPLES

Figure 6:
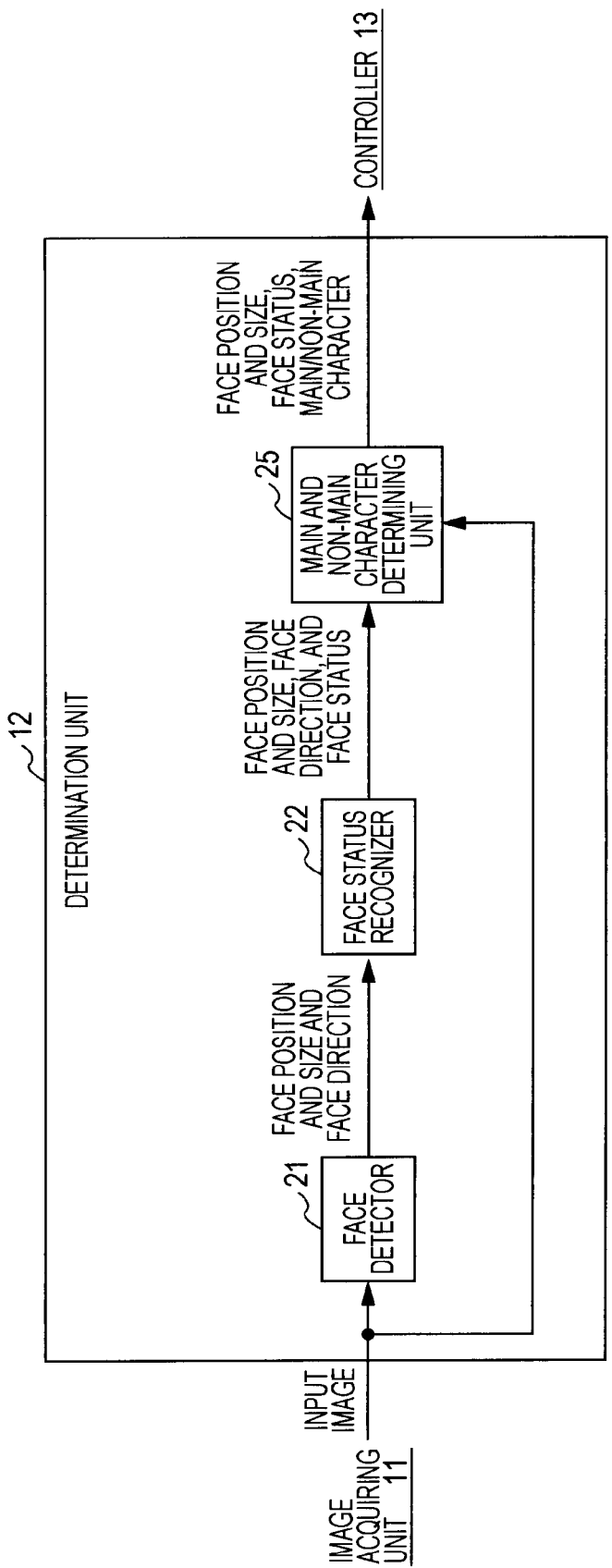
FIG. 6 is a block diagram illustrating another configuration of the determination unit shown in FIG. 1.

FIG. 6 is a block diagram illustrating another configuration of the determination unit 12.

In FIG. 6, the same elements as shown in FIG. 3 are referenced by the same reference numerals and signs. The description thereof is not repeated.

The configuration shown in FIG. 6 is different from the configuration of the determination unit 12 shown in FIG. 3, in that the body detector 23 and the posture recognizer 24 are not provided. The determination unit 12 shown in FIG. 6 includes the face detector 21 and the face shape recognizer 22 and performs the main and non-main character determining process on the basis of the face.

The face detector 21 detects the faces from an input image and acquires the positions, sizes, and directions of the faces in the image. The face detector 21 outputs the information indicating the acquired positions, sizes, and directions of the faces to the face shape recognizer 22.

The face shape recognizer 22 recognizes the statuses of the faces of which the positions and the like are detected by the face detector 21 and outputs the information indicating the recognized face status to the main and non-main character determining unit 25 along with the information supplied from the face detector 21.

The main and non-main character determining unit 25 calculates the score based on the face size and the score based on the face position on the basis of the image supplied from the image acquiring unit 11 and the information supplied from the face shape recognizer 22 as described above.

The main and non-main character determining unit 25 calculates the scores based on the time that a character watches the camera, the time that a character stays in the image, and the time that a character holds a smile out of the scores using the time information, synthesizes at least a part of the calculated scores, and performs the main and non-main character determining process. The information of the determination result is output to the controller 13 along with the information supplied from the face detector 21.

Figure 7:
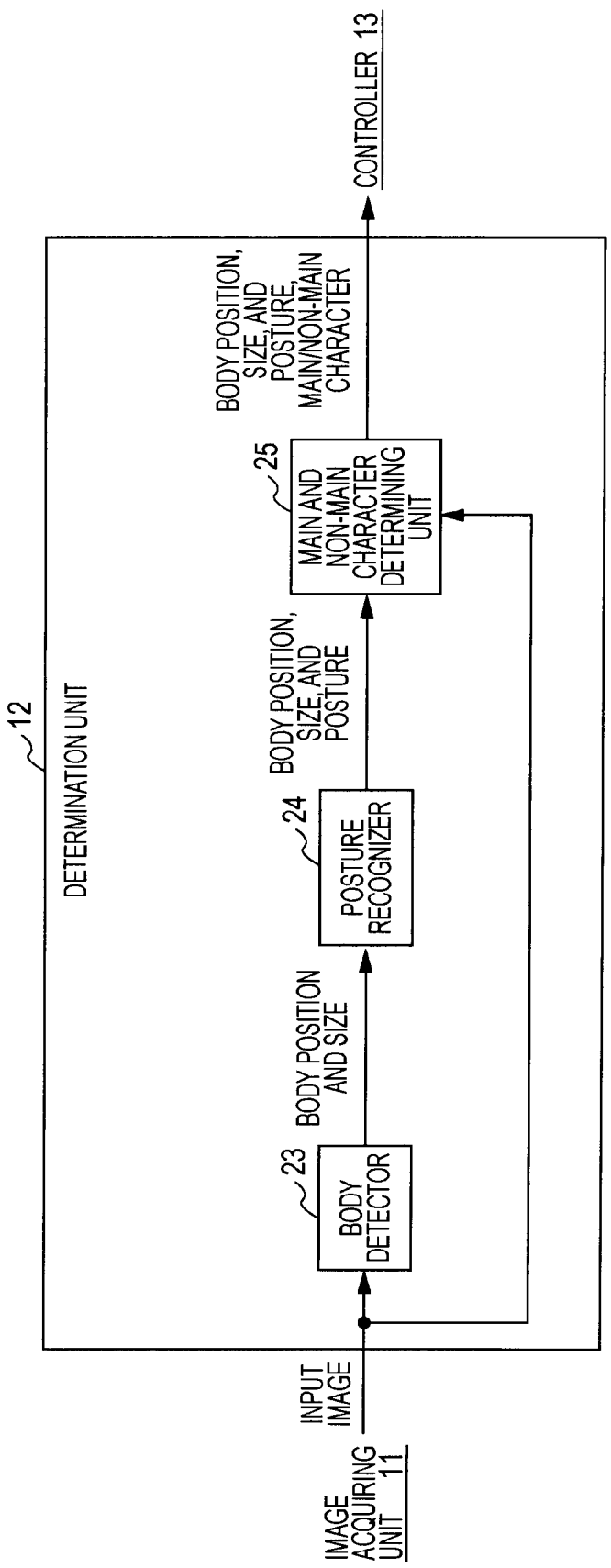
FIG. 7 is a block diagram illustrating still another configuration of the determination unit shown in FIG. 1.

FIG. 7 is a block diagram illustrating still another configuration of the determination unit 12.

In FIG. 7, the same elements as shown in FIG. 3 are referenced by the same reference numerals and signs. The description thereof is not repeated.

The configuration shown in FIG. 7 is different from the configuration of the determination unit 12 shown in FIG. 3, in that the face detector 21 and the face shape recognizer 22 are not provided. The determination unit 12 shown in FIG. 7 includes the body detector 23 and the posture recognizer 24 and performs the main and non-main character determining process on the basis of the body.

The body detector 23 detects the bodies from an input image and outputs information of the positions and sizes of the bodies in the image to the posture recognizer 24.

The posture recognizer 24 recognizes the postures of the bodies of which the positions and the like are detected by the body detector 23 and outputs the information indicating the recognized postures to the main and non-main character determining unit 25 along with the information supplied from the body detector 23.

The main and non-main character determining unit 25 calculates the score based on the body size and the score based on the body position, as described above, on the basis of the image supplied from the image acquiring unit 11 and the information supplied from the posture recognizer 24.

The main and non-main character determining unit 25 calculates the score based on the time that a character stays in the image and the like out of the scores using the time information, synthesizes at least a part of the calculated scores, and performs the main and non-main character determining process. The information of the determination result is output to the controller 13 along with the information supplied from the posture recognizer 24.

In this way, the main and non-main character determining process may be carried out on the basis of only the faces of the characters included in the image or may be carried out on the basis of only the bodies of the characters.

First Application Example

Configuration of Digital Camera

Figure 8:
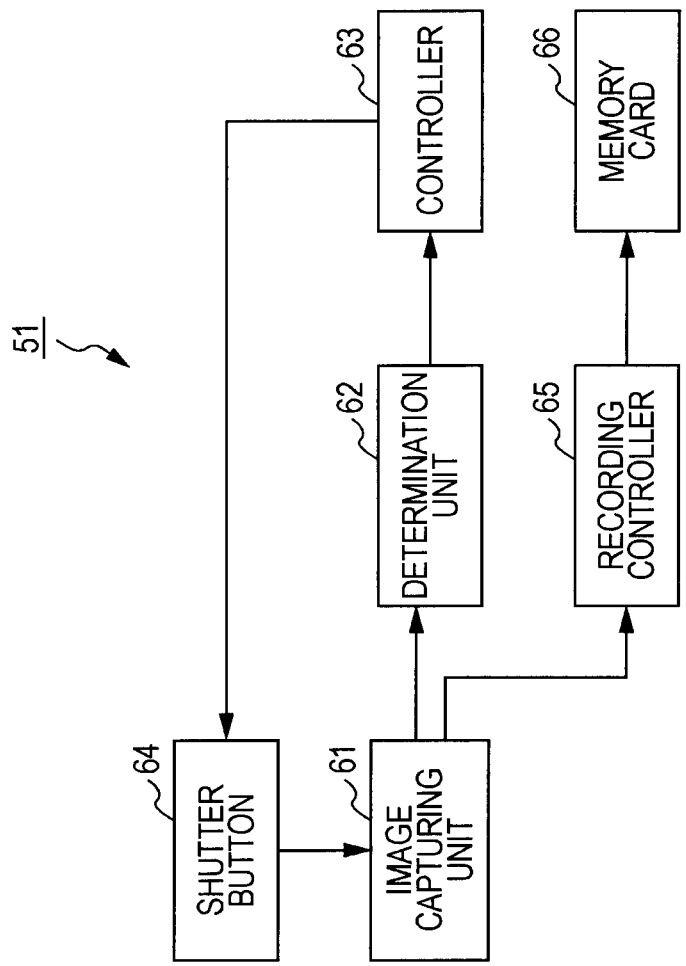
FIG. 8 is a block diagram illustrating a configuration of a digital camera.

FIG. 8 is a block diagram illustrating the configuration of a digital camera employing the image processing device 1 shown in FIG. 1.

The digital camera 51 shown in FIG. 8 includes an image capturing unit 61, a determination unit 62, a controller 63, a shutter button 64, a recording controller 65, and a memory card 66.

The image capturing unit 61 corresponds to the image acquiring unit 11 shown in FIG. 1 and the determination unit 62 corresponds to the determination unit 12. The controller 63 corresponds to the controller 13 and the shutter button 64 or the configuration switching the locked state and the released state of the shutter button 64 corresponds to the processor 14.

The digital camera 51 shown in FIG. 8 is a device controlling the image acquiring process as the image-related process on the basis of the status of a non-main character included in an image.

The image capturing unit 61 includes an image capturing device and an A/D (Analog/Digital) conversion circuit and acquires an image by performing a photoelectric conversion operation and an A/D conversion operation. For example, when the digital camera 51 is turned on, the image capturing unit 61 acquires an image to be used in the main and non-main character determining process and outputs the acquired image to the determination unit 62. The image to be used in the main and non-main character determining process is acquired repeatedly for a predetermined period.

The image capturing unit 61 acquires an image to be recorded by the user's pressing of the shutter button 64 and outputs the acquired image to the recording controller 65.

The determination unit 62 analyzes the image acquired by the image capturing unit 61 and performs the main and non-main character determining process, similarly to the determination unit 12 shown in FIG. 1. The determination unit 62 outputs the information indicating the determination result to the controller 63 along with the information f the positions and sizes of the faces or the bodies acquired by analyzing the image.

The controller 63 specifies a non-main character included in the image acquired by the image capturing unit 61 on the basis of the information supplied from the determination unit 62 and controls the locked state and the released state of the shutter button 64 on the basis of the status of the specified non-main character. The status of the non-main character is detected on the basis of the information supplied from the determination unit 62. When the locked state is set, the shutter button 64 is fixed by a fixing member and thus the shutter button 64 is not pressed.

For example, the controller 63 detects the relative or absolute sizes of the face and body of the non-main character as the status of the non-main character, and switches the shutter button 64 to the locked state when the size is great. Accordingly, it is not possible to capture an image when the areas of the face and the body of the non-main character are greater than the areas of the face and the body of the main character or greater than a threshold area.

When the areas of the face and the body of the non-main character are smaller than the areas of the face and the body of the main character or smaller than a threshold area, the shutter button 64 is released to capture an image.

The controller 63 detects the positions of the face and the body of the non-main character as the status of the non-main character, and switches the shutter button 64 to the locked state when the positions are located in the vicinity of the center. Accordingly, it is not possible to capture an image when the face or body of the non-main character is located in a predetermined area set in the vicinity of the center of the image.

When the positions of the face and the body of the non-main character depart from the area, the shutter button 64 is released to capture an image.

The controller 63 detects the directions of the face and the body of the non-main character as the status of the non-main character, and switches the shutter button 64 to the locked state when the direction of the face or body is directed to the digital camera 51. Accordingly, it is not possible to capture an image when the sight line of the non-main character or the direction of the face or body is in a predetermined range set toward the digital camera 51.

When the sight line of the non-main character or the direction of the face and the body depart from the predetermined range, the shutter button 64 is released to capture an image.

The controller 63 detects the status of the non-main character, and switches the shutter button 64 to the locked state when one of the plural conditions is satisfied, thereby not capturing an image.

The recording controller 65 records the image, which is obtained by performing a process of compressing an image which will be recorded and has been supplied from the image capturing unit 61, in the memory card 66 inserted into a slot.

Figure 9:
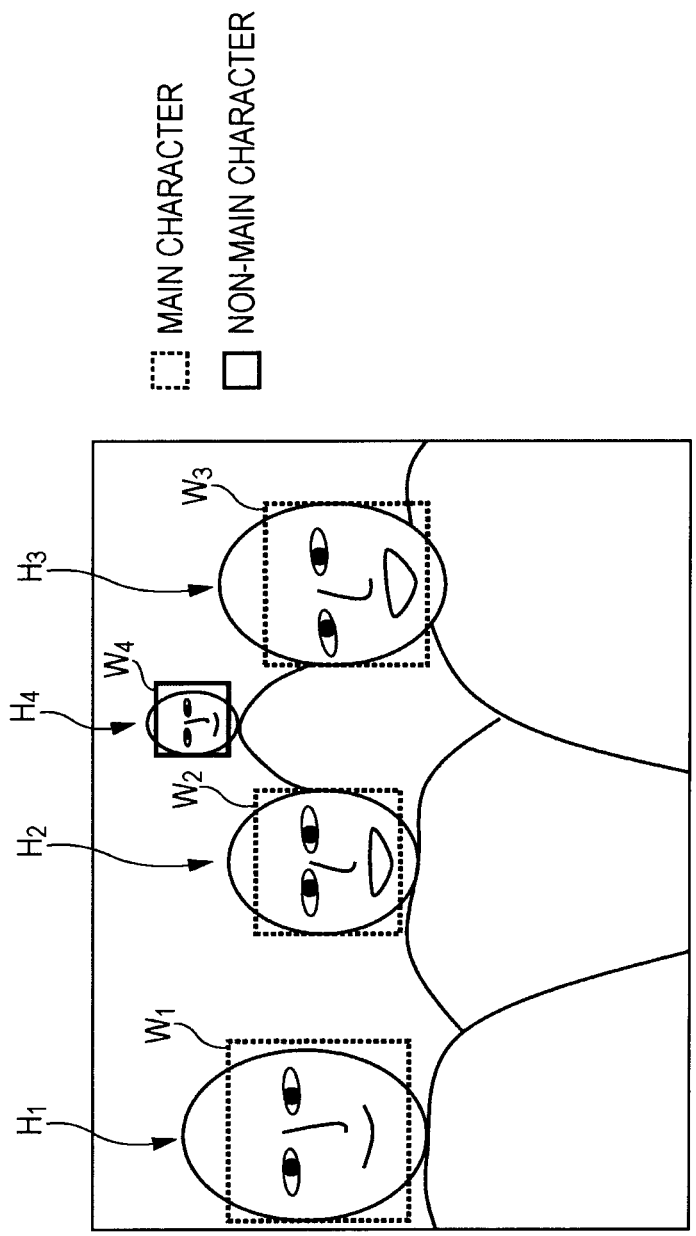
FIG. 9 is a diagram illustrating an example of an image.

FIG. 9 is a diagram illustrating an example of a captured image.

The image shown in FIG. 9 includes four characters $H_1$ to $H_4$. Three characters $H_1$ to $H_3$ out of the characters $H_1$ to $H_4$ are located close to the digital camera 51 and the character $H_4$ is located in the rear of the characters $H_1$ to $H_3$.

When the image shown in FIG. 9 is acquired, the determination unit 62 detects the positions, areas, and directions of the faces of the characters $H_1$ to $H_4$ as described above.

Frames $W_1$ to $W_3$ indicated by dotted lines represent the face regions of the characters $H_1$ to $H_3$ detected by the determination unit 62, respectively, and a frame $W_4$ indicated by a solid line represents the face region of the character $H_4$. The face area of the character $H_4$ surrounded with the frame $W_4$ is smaller than the face areas of the characters $H_1$ to $H_4$ surrounded with the frames $W_1$ to $W_3$. All the characters $H_1$ to $H_4$ are directed to the digital camera 51.

The determination unit 62 determines that the characters $H_1$ to $H_3$ are main characters and the character $H_4$ is a non-main character, on the basis of the areas and the like.

When this determination result is acquired, the controller 63 detects that the face of the character $H_4$ determined as the non-main character is directed to the digital camera 51 and switches the shutter button 64 to the locked state.

That is, even when the characters $H_1$ to $H_3$ as the main characters are located great in the vicinity of the center and are directed to the digital camera 51, it is not possible to capture an image at this time.

Figure 10:
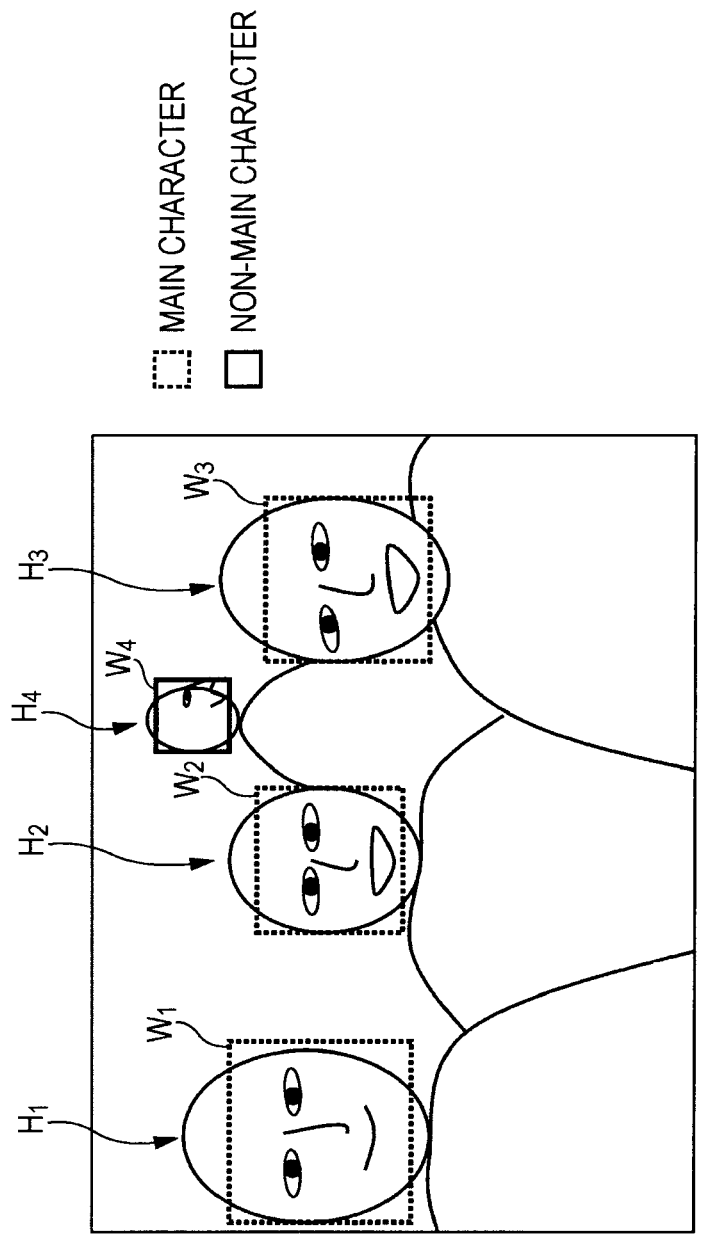
FIG. 10 is a diagram illustrating another example of an image.

FIG. 10 is a diagram illustrating another example of a captured image.

Out of the characters shown in FIG. 10, the same characters as shown in FIG. 9 are referenced by the same reference numerals and signs. The same is true in the images shown in FIG. 11 and the like.

When the image shown in FIG. 10 is acquired, the determination unit 62 detects the positions, areas, and directions of the faces of the characters $H_1$ to $H_4$.

In the example shown in FIG. 10, the face area of the character $H_4$ surround with the frame $W_4$ is smaller than the face areas of the characters $H_1$ to $H_3$ surround with the frames $W_1$ to $W_3$. Out of the characters $H_1$ to $H_4$, three characters $H_1$ to $H_3$ are directed to the digital camera 51, but the character $H_4$ is not directed to the digital camera 51.

The determination unit 62 determines that the characters $H_1$ to $H_3$ are main characters and the character $H_4$ is a non-main character, on the basis of the areas and the like.

When this determination is made by the determination unit 62, the controller 63 detects that the face of the character $H_4$ determined as the non-main character is not directed to the digital camera 51, and switches the shutter button 64 to the released state.

Since the character $H_4$ as the non-main character is captured but is not directed to the digital camera 51 and is thus not marked, it is possible to capture an image at this time.

Figure 11:
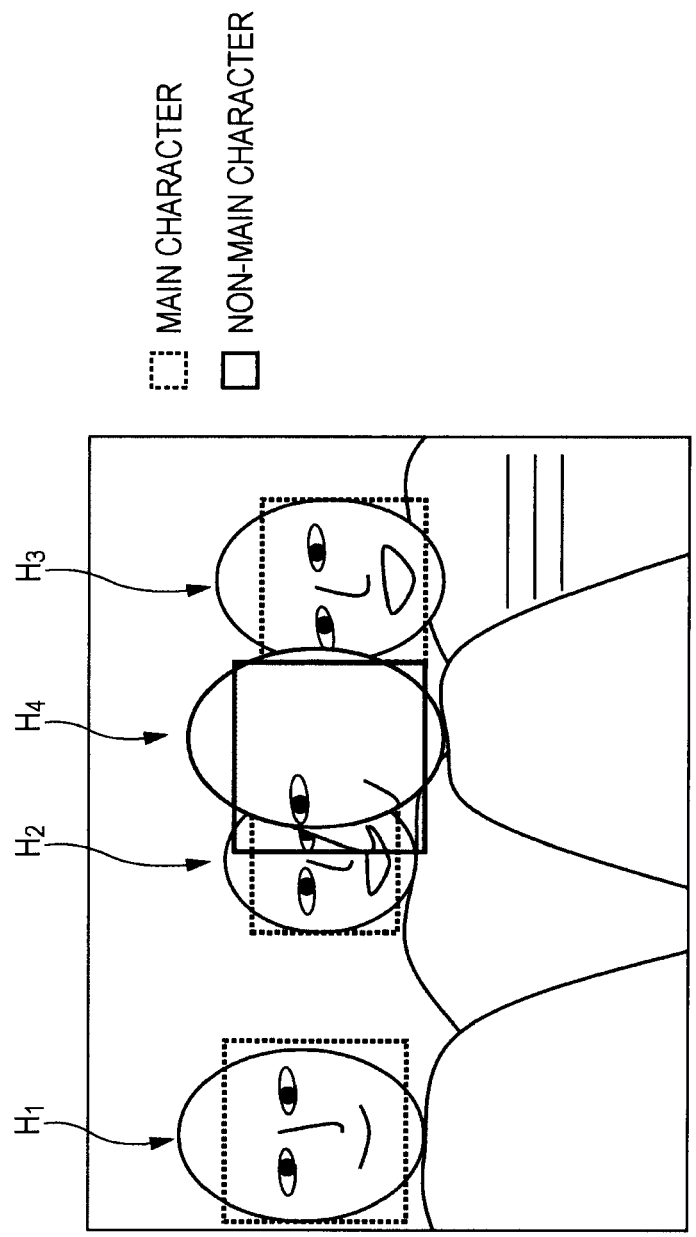
FIG. 11 is a diagram illustrating still another example of an image.

FIG. 11 is a diagram illustrating still another example of a captured image.

When the image shown in FIG. 11 is acquired, the determination unit 62 detects the positions, areas, and directions of the faces of the characters $H_1$ to $H_4$.

The determination unit 62 determines that the characters $H_1$ to $H_3$ are main characters and the character $H_4$ is a non-main character, on the basis of the score based on the time information and the like.

Since the character $H_4$ out of the characters $H_1$ to $H_4$ included in the image shown in FIG. 11 is great in face area and is located in the vicinity of the center but it is detected that it moves from right to left on the basis of the analysis result on the successively captured images, the character $H_4$ is determined as a non-main character. In FIG. 11, three horizontal lines displayed on the right side of the body of the character. $H_4$ mean that the character $H_4$ is moving.

When this determination result is acquired from the determination unit 62, the controller 63 detects that the face of the character $H_4$ determined as the non-main character is located in the vicinity of the center of the image, and switches the shutter button 64 to the locked state.

Figure 12:
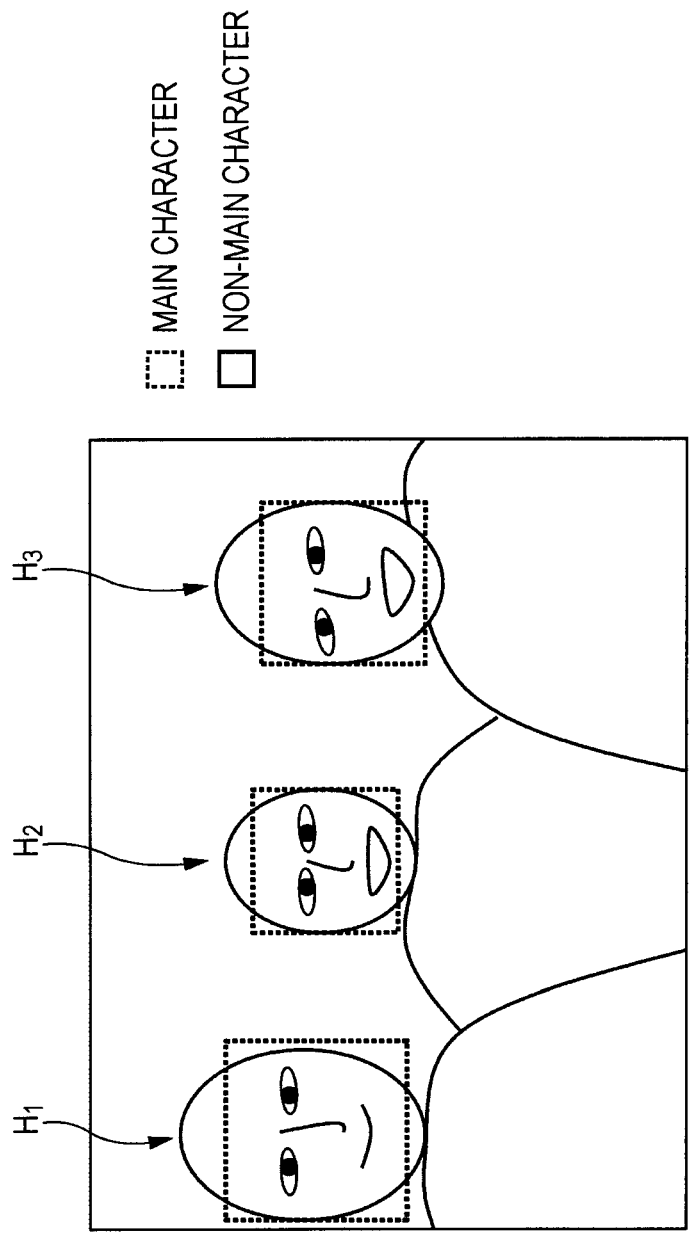
FIG. 12 is a diagram illustrating an example of an image.

As shown in FIG. 12, when the character $H_4$ passes by and is thus included in the image, the shutter button 64 in the locked state is released, thereby capturing an image.

Operation of Digital Camera

The flow of a shutter control process of the digital camera 51 having the configuration shown in FIG. 8 will be described with reference to the flowchart shown in FIG. 13.

Figure 13:
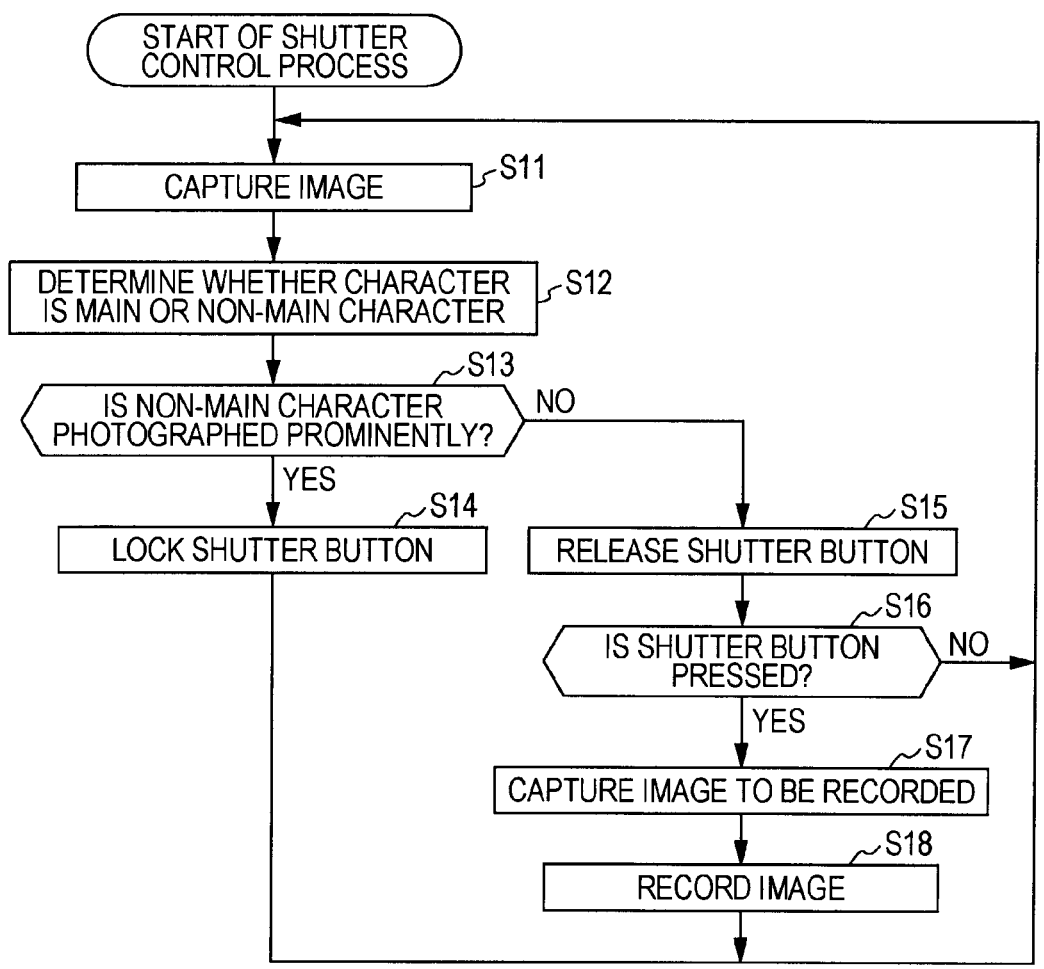
FIG. 13 is a flowchart illustrating a shutter control process of the digital camera having the configuration shown in FIG. 8.

The flow of processes shown in FIG. 13 is started, for example, when the digital camera 51 is turned on.

In step S11, the image capturing unit 61 captures an image and acquires the image.

In step S12, the determination unit 62 analyzes the image acquired by the image capturing unit 61 and performs the main and non-main character determining process.

In step S13, the controller 63 determines whether a character determined as a non-main character is marked in the acquired image on the basis of the status of the non-main character. As described above, when the areas of the face and the body of the non-main character is great, when the position of the face and the body of the non-main character is located in the vicinity of the center of the image, or when the sight line of the non-main character or the direction of the face and the body is directed to the digital camera 51, it is determined that the non-main character is marked.

When it is determined in step S13 that the non-main character is marked, the controller 63 sets the shutter button 64 to the locked state in step S14. Thereafter, the processes subsequent to step S11 are repeatedly performed.

On the other hand, when it is determined in step S13 that the non-main character is not marked, the controller 63 sets the shutter button 64 to the released state in step S15. When the shutter button has been in the locked state, it is possible to press the shutter button 64 to capture an image. When the shutter button has been in the released state, the released state is maintained.

In step S16, the image capturing unit 61 determines whether the shutter button 64 is pressed.

When it is determined in step S16 that the shutter button 64 is pressed, the image capturing unit 61 captures an image to be recorded in step S17.

In step S18, the recording controller 65 records the image captured by the image capturing image 61 in the memory card 66.

After the image is recorded or when it is determined in step S16 that the shutter button 64 is not pressed, the processes subsequent to step S11 are repeatedly performed. When an end of the image capturing is instructed, the flow of processes shown in FIG. 13 is ended.

As described above, by controlling the shutter button 64 on the basis of the status of the non-main character not desired to capture instead of the status of a main character desired to capture, it is possible to prevent the capturing of an image in which a non-main character and a main character are equivalently marked.

Although it has been described that the image acquiring process as the image-related process is controlled by switching the state of the shutter button 64, the shutter button may be controlled by other methods.

For example, when a non-main character is marked, it is possible to control the image acquiring process by causing image capturing device not to capture an image or not supplying the captured image to the recording controller 65, even with the pressing of the shutter button 64.

Second Application Example

Configuration of Digital Camera

Figure 14:
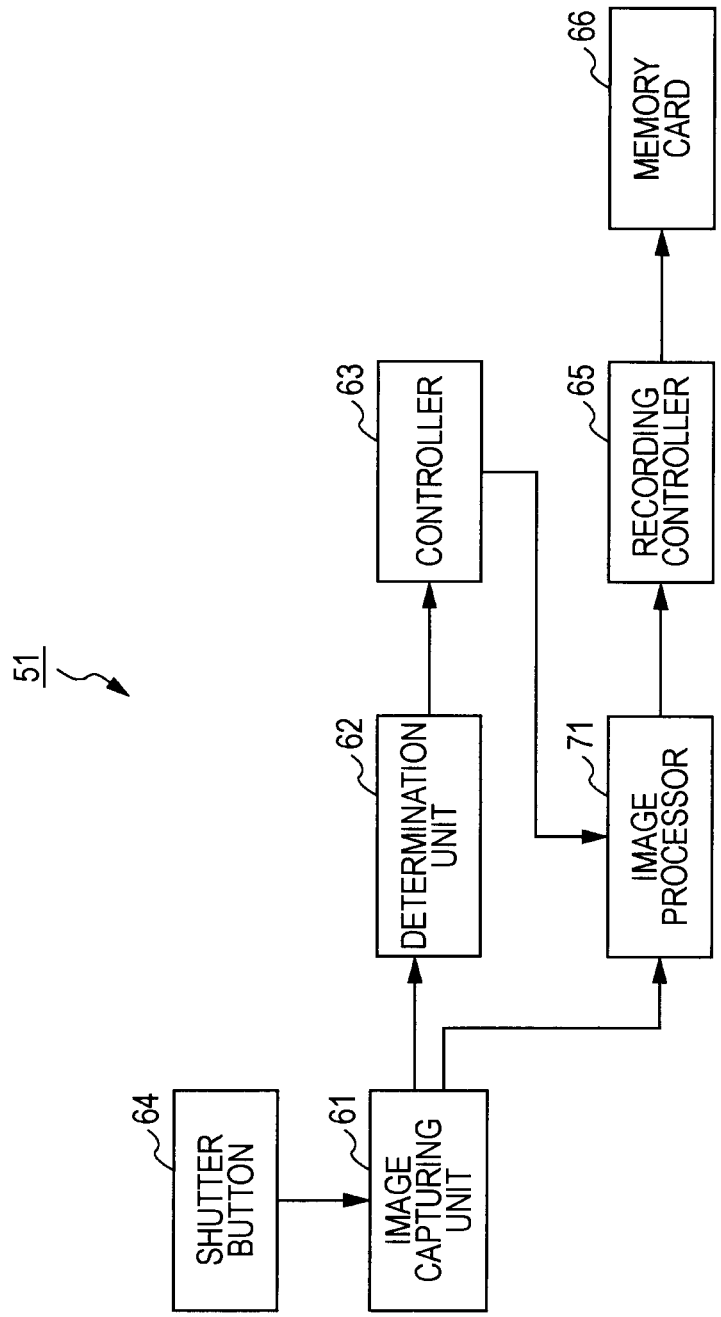
FIG. 14 is a block diagram illustrating another configuration of a digital camera.

FIG. 14 is a block diagram illustrating another configuration of a digital camera employing the image processing device 1.

In FIG. 14, the same elements as shown in FIG. 8 are referenced by the same reference numerals. The description thereof is not repeated.

The digital camera 51 shown in FIG. 14 includes an image capturing unit 61, a determination unit 62, a controller 63, a shutter button 64, a recording controller 65, a memory card 66, and an image processor 71.

The configuration shown in FIG. 14 is different from the configuration shown in FIG. 8, in that the image processor 71 is additionally provided and the image processor 71, not the shutter button 64, is controlled by the controller 63.

The image capturing unit 61 corresponds to the image acquiring unit 11 shown in FIG. 1 and the determination unit 62 corresponds to the determination unit 12. The controller 63 corresponds to the controller 13 and the image processor 71 corresponds to the processor 14.

The digital camera 51 shown in FIG. 14 is a device controlling the image acquiring process as the image-related process on the basis of the status of a non-main character included in an image.

The image capturing unit 61 captures and acquires an image used in the main and non-main character determining process and outputs the acquired image to the determination unit 62. The image capturing unit 61 acquires an image to be recorded by the user's pressing of the shutter button 64 and outputs the acquired image to the image processor 71.

The determination unit 62 analyzes the image acquired by the image capturing unit 61 and performs the main and non-main character determining process. The determination unit 62 outputs the information indicating the determination result to the controller 63 along with the information f the positions and sizes of the faces or the bodies.

The controller 63 specifies a non-main character included in the image acquired by the image capturing unit 61 on the basis of the information supplied from the determination unit 62 and controls the image processing process of the image processor 71 on the basis of the status of the specified non-main character.

For example, when a non-main character is marked, the controller 63 controls the image processor 71 to performing the image processing process such as gradating the part corresponding to the non-main character in the image to be recorded. Information specifying the part corresponding to the non-main character is supplied from the controller 63 to the image processor 71.

When the non-main character is not marked, the controller 63 outputs the image to be recorded, which is captured by the image capturing unit 61, to the recording controller 65 without any change.

The image processor 71 properly processes the image supplied from the image capturing unit 61 in response to the pressing of the shutter button 64 under the control of the controller 63.

That is, when it is not instructed to process an image, the image processor 71 specifies the part in which the non-main character is marked in the image to be recorded on the basis of the information supplied from the controller 63. The image processor 71 gradates the part in which the specified non-main character is marked by lowering the sharpness thereof or the like, and outputs the image to be recorded, a part of which is gradated, to the recording controller 65.

When it is not instructed to process an image, the image processor 71 outputs the image supplied from the image capturing unit 61 to the recording controller 65 without any change.

The recording controller 65 compresses or the like the image supplied from the image processor 71 and records the resultant image in the memory card 66.

Figure 15:
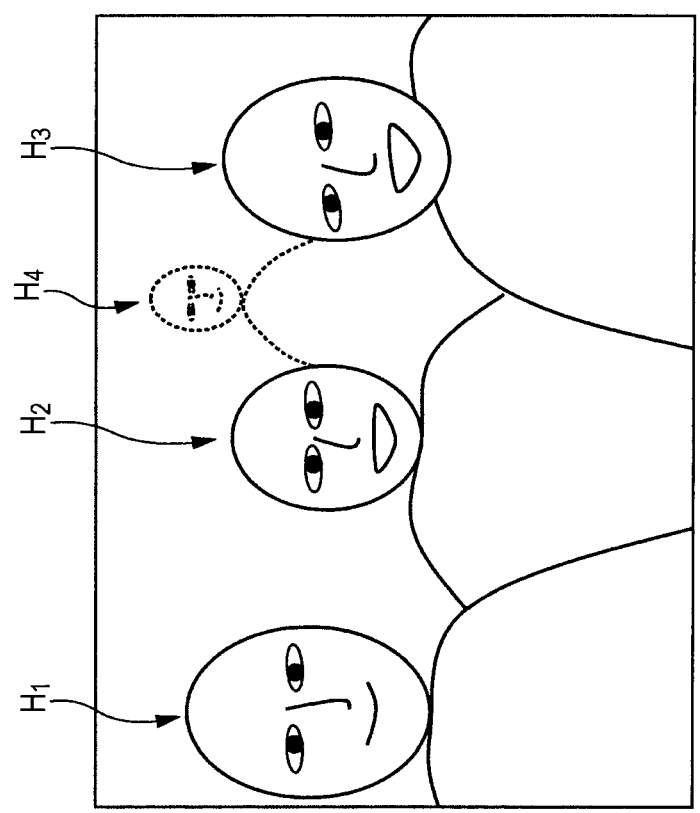
FIG. 15 is a diagram illustrating an example of a processed image.

FIG. 15 is a diagram illustrating an example of a processes image.

For example, when the image including the characters $H_1$ to $H_4$ and having been described with reference to FIG. 9 is acquired as the image used in the main and non-main character determining process, the determination unit 62 detects the positions, areas, and directions of the characters $H_1$ to $H_4$. It is determined on the basis of the areas and the like that the characters $H_1$ to $H_3$ are main characters and the character $H_4$ is a non-main character.

The controller 63 detects that the face of the character $H_4$ determined as a non-main character is directed to the digital camera 51, and gives an instruction to process the image to the image processor 71. The information specifying the part in which the character $H_4$ is marked is supplied from the controller 63 to the image processor 71.

When the shutter button 64 is pressed in this state and it is thus instructed to capture an image, the image processor 71 performs the process of gradating the part in which the character $H_4$ is marked on the image to be recorded, as shown in FIG. 15. In FIG. 15, the dotted line indicating the character $H_4$ means that the part in which the character $H_4$ is marked is gradated.

Operation of Digital Camera

Figure 16:
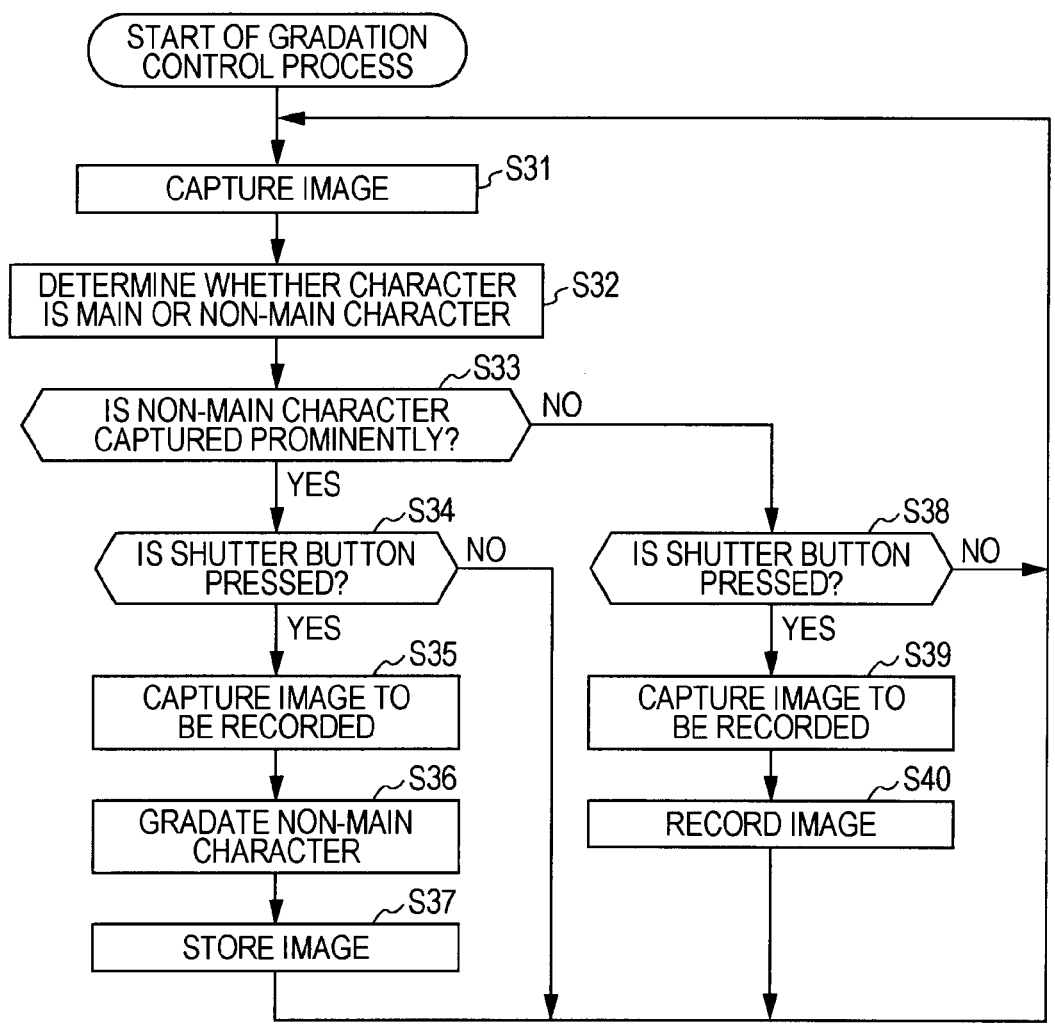
FIG. 16 is a flowchart illustrating a gradation control process of the digital camera having the configuration shown in FIG. 14.

The flow of the gradation control process of the digital camera 51 having the configuration shown in FIG. 14 will be described with reference to the flowchart shown in FIG. 16.

In step S31, the image capturing unit 61 captures an image and acquires the image.

In step S32, the determination unit 62 analyzes the image acquired by the image capturing unit 61 and performs the main and non-main character determining process.

In step S33, the controller 63 determines whether a character determined as a non-main character is marked in the acquired image on the basis of the status of the non-main character. Here, when the areas of the face and the body of the non-main character is great, when the position of the face and the body of the non-main character is located in the vicinity of the center of the image, or when the sight line of the non-main character or the direction of the face and the body is directed to the digital camera 51, it is determined that the non-main character is marked.

When it is determined in step S33 that the non-main character is marked, the image capturing unit 61 determines whether the shutter button 64 is pressed in step S34.

When it is determined in step S34 that the shutter button 64 is pressed, the image capturing unit 61 captures an image to be recorded in step S35.

In step S36, the image processor 71 performs the process of gradating the part in which the non-main character is marked on the image to be recorded. When it is determined when the non-main character is marked, an instruction to process the image is given from the controller 63 to the image processor 71.

In step S37, the recording controller 65 records the image processed by the image processor 71 in the memory card 66.

After the image is recorded or when it is determined in step S34 that the shutter button 64 is not pressed, the processes subsequent to step S31 are repeatedly performed.

On the other hand, when it is determined in step S33 that the non-main character is not marked, the image capturing unit 61 determines whether the shutter button 64 is pressed in step S38.

When it is determined in step S38 that the shutter button 64 is pressed, the image capturing unit 61 captures an image to be recorded in step S39. The captured image is supplied to the recording controller 65 via the image processor 71.

In step S40, the recording controller 65 records the non-processed image supplied from the image processor 71 in the memory card 66.

After the image is recorded or when it is determined in step S38 that the shutter button 64 is not pressed, the processes subsequent to step S31 are repeatedly performed. When it is instructed to end the image capturing process, the flow of processes shown in FIG. 16 is ended.

As described above, by controlling the processing of an image on the basis of the status of the non-main character not desired to capture instead of the status of a main character desired to capture, it is possible to prevent the recording of an image in which a non-main character and a main character are equivalently marked. By performing the gradation process, the non-main character is not marked in comparison with the main character in the recorded image.

Third Application Example

Configuration of Digital Camera

Figure 17:
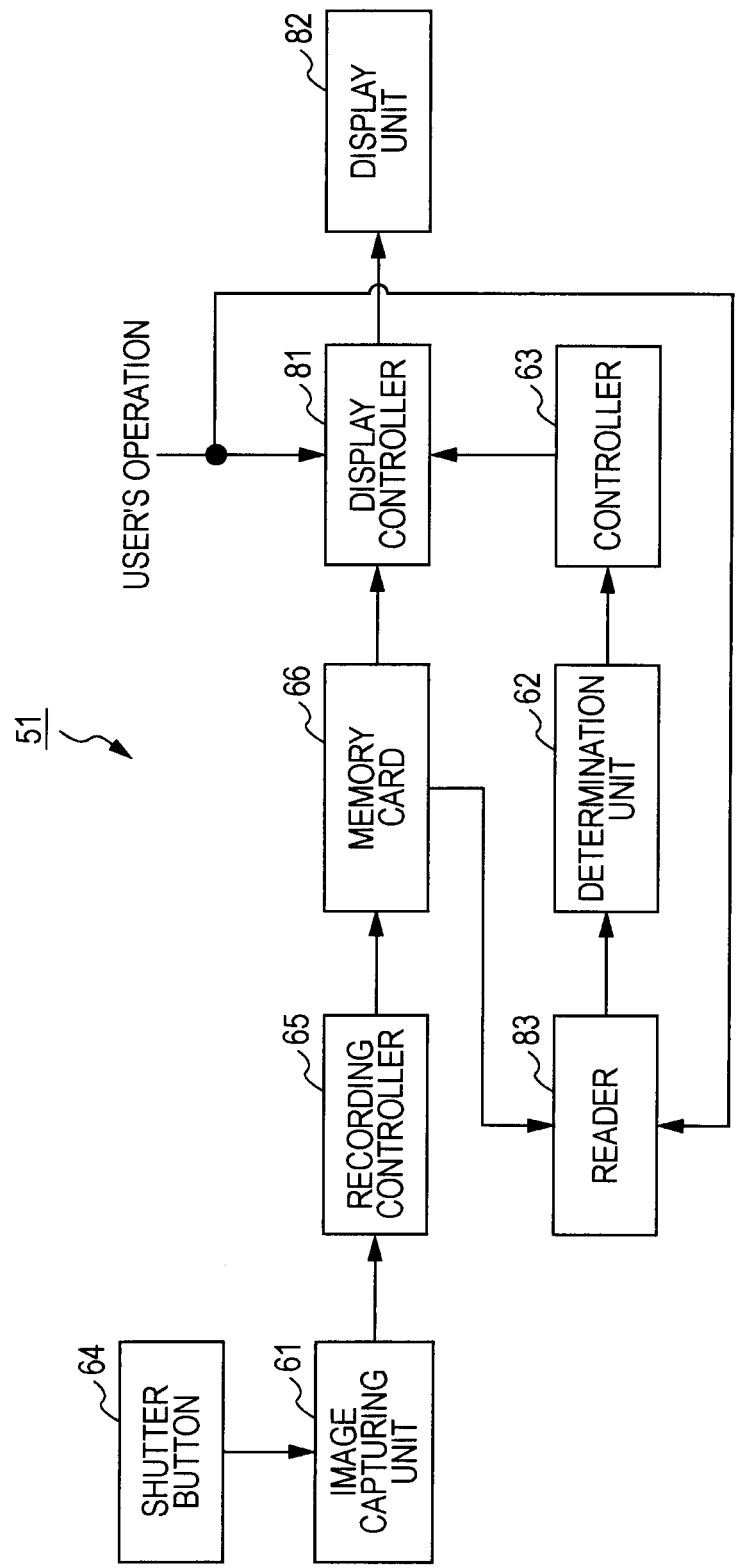
FIG. 17 is a block diagram illustrating still another configuration of a digital camera.

FIG. 17 is a block diagram illustrating another configuration of a digital camera employing the image processing device 1.

In FIG. 17, the same elements as shown in FIG. 8 are referenced by the same reference numerals. The description thereof is not repeated.

The digital camera 51 shown in FIG. 17 includes an image capturing unit 61, a determination unit 62, a controller 63, a shutter button 64, a recording controller 65, a memory card 66, a display controller 81, a display unit 82, and a reader 83.

The configuration shown in FIG. 17 is different from the configuration shown in FIG. 8, in that the display controller 81, the display unit 82, and the reader 83 are additionally provided and the display controller 81, not the shutter button 64, is controlled by the controller 63.

The reader 83 corresponds to the image acquiring unit 11 and the determination unit 62 corresponds to the determination unit 12. The controller 63 corresponds to the controller 13 and the display controller 81 corresponds to the processor 14.

The digital camera 51 shown in FIG. 17 is a device controlling the image displaying process as the image-related process on the basis of the status of a non-main character included in an image.

The image capturing unit 61 acquires an image to be recorded by the user's pressing of the shutter button 64 and outputs the acquired image to the recording controller 65.

The recording controller 65 records an image, which is obtained by compressing or the like the image supplied from the image capturing unit 61, in the memory card 66.

When a user instructs to display an image recorded in the memory card 66, the display controller 81 reads the instructed image from the memory card 66. A signal is input to the display controller 81 in response to the user's operation and it is instructed to display plural images, for example, to display the images recorded in the memory card 66 in a list in the thumbnail form.

The display controller 81 displays the image selected as the image to be displayed by the controller 63 out of the images read from the memory card 66 on the display unit 82 formed of, for example, an LCD (Liquid Crystal Display) under the control of the controller 63.

When the user instructs to display the images recorded in the memory card 66, the reader 83 reads and acquires the instructed images from the memory card 66, similarly to the display controller 81, and outputs the acquired images to the determination unit 62.

The determination unit 62 analyzes the image acquired by the reader 83 and performs the main and non-main character determining process. Since the recorded images are used, the main and non-main character determining process is performed using the scores other than the score using the time information out of the above-mentioned scores. The determination unit 62 outputs the information indicating the determination result to the controller 63 along with the information on the positions and sizes of the faces or the bodies.

The controller 63 specifies a non-main character included in the image acquired by the reader 83 on the basis of the information supplied from the determination unit 62, and controls the image displaying process of the display controller 81 on the basis of the status of the specified non-main character.

For example, the controller 63 does not select the image in which the non-main character is marked out of the images read from the memory card 66, but selects only the images in which the non-main character is not marked as the images to be displayed. The controller 63 outputs information indicating what image is the selected images to the display controller 81 and controls the image display.

Operation of Digital Camera

The flow of the display control process of the digital camera 51 having the configuration shown in FIG. 17 will be described with reference to the flowchart shown in FIG. 18.

Figure 18:
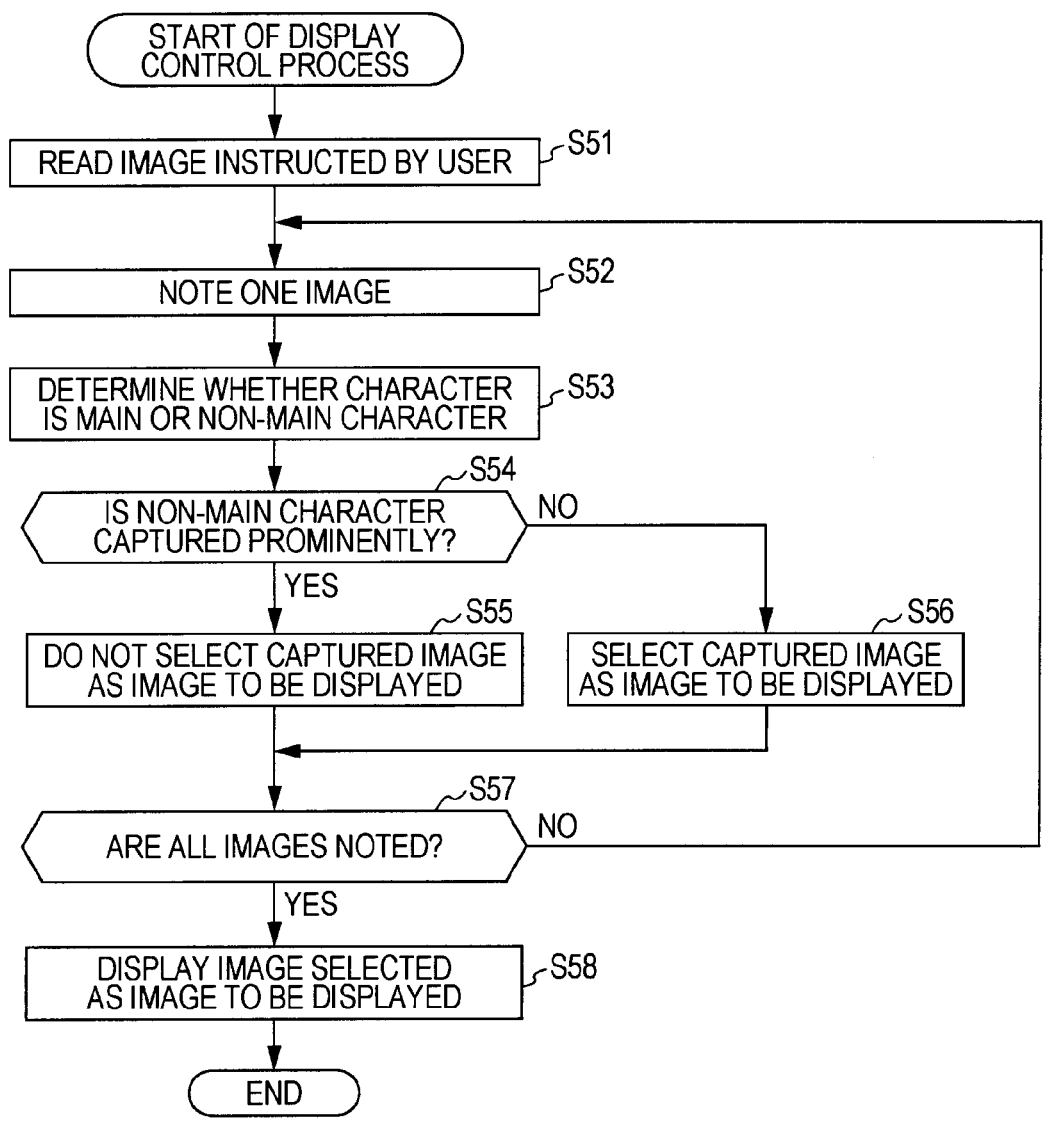
FIG. 18 is a flowchart illustrating a display control process of the digital camera having the configuration shown in FIG. 17.

The flow of processes shown in FIG. 18 is started when a user instructs to display the recorded images in the state where plural captured images are recorded in the memory card 66.

In step S51, the reader 83 reads and acquires an image specified by the user from the memory card 66. Similarly, the display controller 81 also reads and acquires the image specified by the user from the memory card 66.

In step S52, the determination unit 62 notes a sheet of image acquired by the reader 83.

In step S53, the determination unit 62 analyzes the noted image and performs the main and non-main character determining process.

In step S54, the controller 63 determines whether a non-main character is marked in the noted image. At this time, when the areas of the face and the body of the non-main character is great, when the position of the face and the body of the non-main character is located in the vicinity of the center of the image, or when the sight line of the non-main character or the direction of the face and the body is directed to the digital camera 51, it is determined that the non-main character is marked.

When it is determined in step S54 that the non-main character is marked, the controller 63 does not select the noted image as the image to be displayed in step S55.

On the other hand, when it is determined in step S54 that the non-main character is not marked, the controller 63 selects the noted image as the image to be displayed in step S56. The information on the image selected as the image to be displayed is sequentially supplied from the controller 63 to the display controller 81.

After the noted image is not selected as the image to be displayed in step S55 or after the noted image is selected as the image to be displayed in step S56, the determination unit 62 determines whether all the read images are noted in step S57.

When it is determined in step S57 that all the image are not noted, the determination unit 62 repeatedly performs the same process on another noted image in step S52.

When it is determined in step S57 that all the image are noted, the display controller 81 displays the image, which is selected as the image to be displayed by the controller 63 out of the images read from the memory card 66, on the display unit 82 in step S58. Thereafter, the flow of processes is ended.

As described above, by controlling the displaying of an image on the basis of the status of the non-main character not desired to capture instead of the status of a main character desired to capture, it is possible to prevent the displaying of an image in which a non-main character and a main character are equivalently marked.

Instead of excluding the image from the images to be displayed, the part in which the non-main character is marked may be gradated and then the image in which the non-main character is marked may be displayed. In this case, it is also possible to prevent the displaying of the image in which a non-main character and a main character are equivalently marked.

Modified Examples

Although it has been described that the main and non-main character determining process is performed on the basis of the scores calculated for each character captured as a subject, the main and non-main character determining process may be performed on the basis of pre-registered face images.

Figure 19:
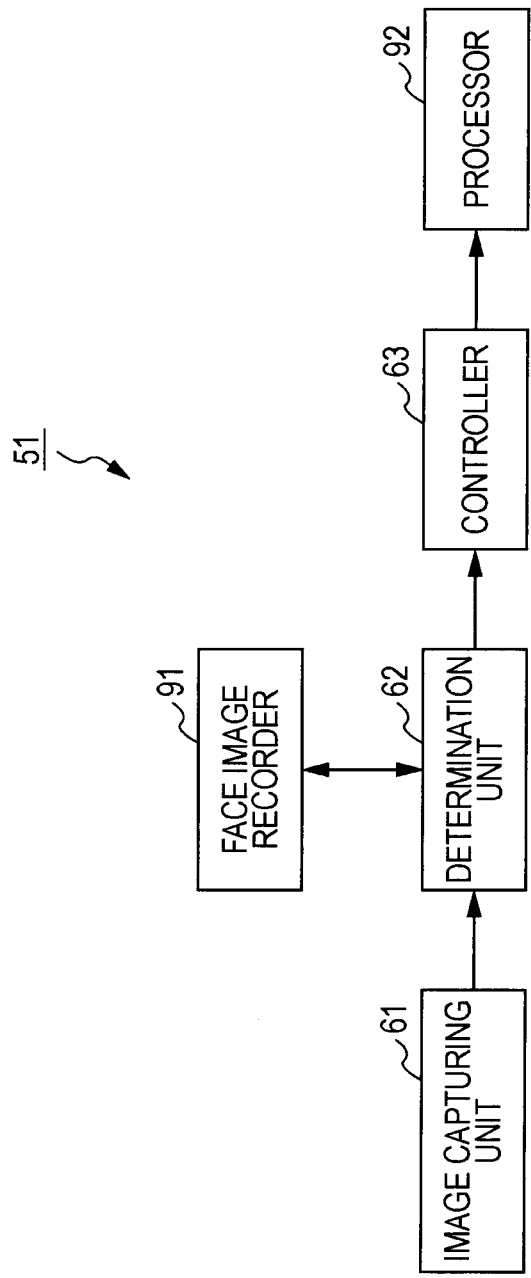
FIG. 19 is a block diagram illustrating still another configuration of a digital camera.

FIG. 19 is a block diagram illustrating the configuration of a digital camera 51 performing the main and non-main character determining process on the basis of the pre-registered face images.

The image capturing unit 61 captures and acquires an image to be used in the main and non-main character determining process and outputs the acquired image to the determination unit 62.

The determination unit 62 analyzes the image acquired by the image capturing unit 61 and extracts face images included in the acquired image. The determination unit 62 calculates correlation values between the extracted face images and the face images recorded in a face image recorder 91, determines the character with the face image of which the correlation value is greater than a threshold value as the main character, and determines the character with the face image of which the correlation value is less than the threshold value as the non-main character, respectively.

The face image recorder 91 records the face image of the main character. The registration of the face image in the face image recorder 91 is carried out, for example, by providing the user with the face images extracted by the determination unit 62 and recording the face image selected by the use.

The controller 63 controls the image-related process performed by the processor 92 on the basis of the statuses of the non-main characters.

The processor 92 performs the image-related process under the control of the controller 63.

The main and non-main character determining process may be performed on the basis whether the corresponding character is a character specified directly by the user.

Figure 20:
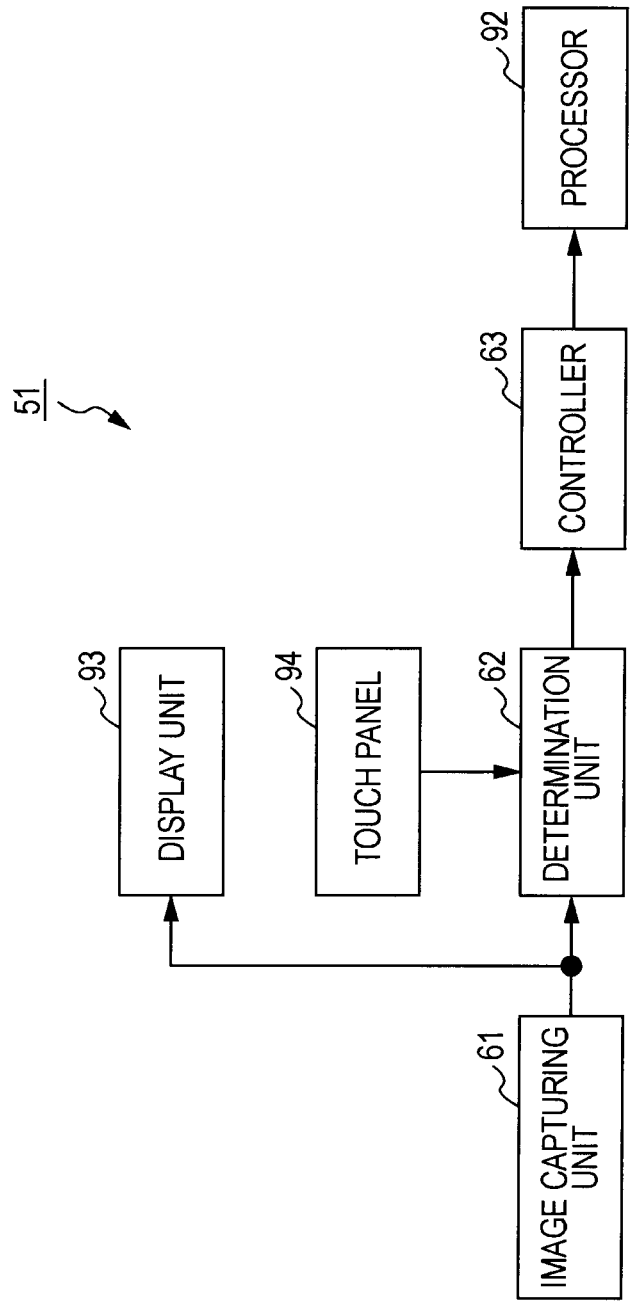
FIG. 20 is a block diagram illustrating still another configuration of a digital camera.

FIG. 20 is a block diagram illustrating the configuration of a digital camera 51 performing the main and non-main character determining process on the basis whether the corresponding character is a character specified directly by the user.

The image capturing unit 61 captures and acquires an image to be used in the main and non-main character determining process and outputs the acquired image to the determination unit 62 and the display unit 93. The image captured by the image capturing unit 61 may be used as the image to be displayed.

The display unit 93 displays the image captured by the image capturing unit 61.

The touch panel 94 is stacked on the display unit 93, and outputs information on the position with which the user's thumbnail or the like comes in contact to the determination unit 62.

Out of the characters included in the image displayed on the display unit 93, the determination unit 62 determines the character on the display unit 93 brought into contact by the user as the main character and determines the character not brought into contact by the user as the non-main character on the basis of the information supplied from the touch panel 94.

The controller 63 controls the image-related process performed by the processor 92 on the basis of the statuses of the non-main characters.

The processor 92 performs the image-related process under the control of the controller 63.

Although it has been described that the image processing device 1 shown in FIG. 1 is applied to a digital camera, the image processing device may be applied to various apparatuses such as a television receiver, a mobile phone, and a personal computer as long as they have a function of acquiring an image.

For example, the control of the process of displaying an image as an image-related process may be mounted as an application of a personal computer.

The above-mentioned processes may be performed on a video, as well as a still image.

The above-mentioned series of processes may be embodied by hardware or software. When the series of processes are embodied by software, a program of the software is installed in a computer mounted on exclusive hardware or a general-purpose personal computer from a program recording medium.

Figure 21:
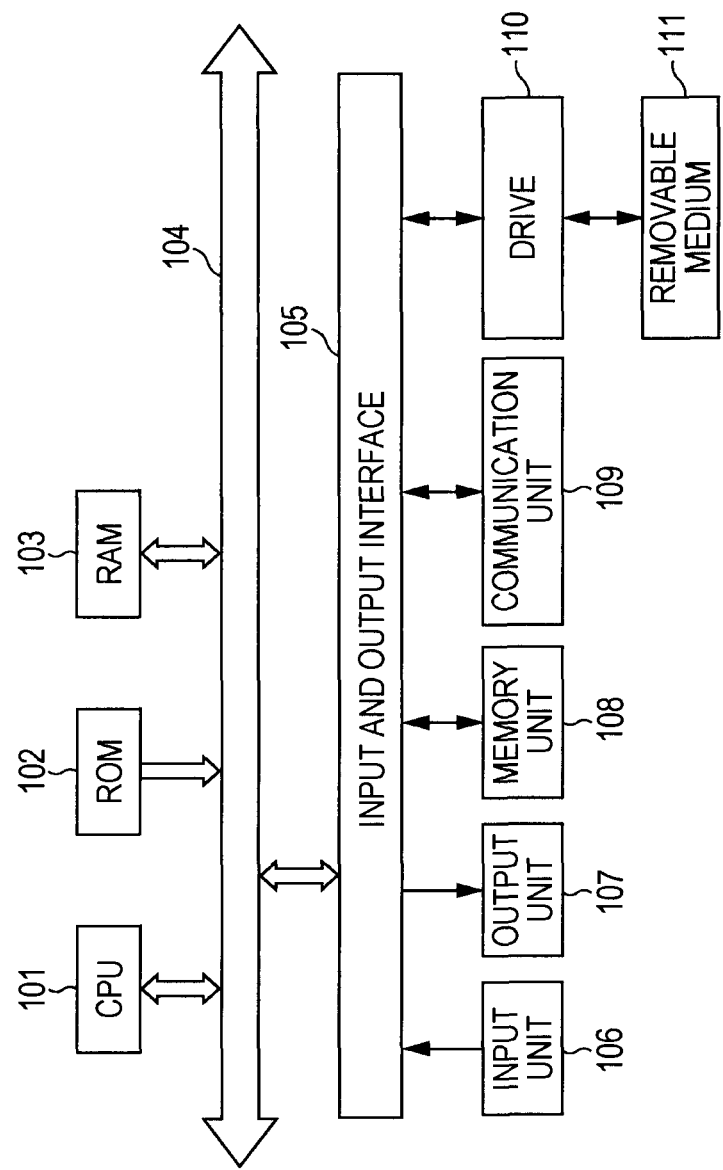
FIG. 21 is a block diagram illustrating a hardware configuration of a computer.

FIG. 21 is a block diagram illustrating a hardware configuration of a computer performing the above-mentioned series of processes by the use of the program.

A CPU (Central Processing Unit) 101, a ROM (Read Only Memory) 102, and a RAM (Random Access Memory) 103 are connected to each other via a bus 104.

In addition, an input and output interface 105 is connected to the bus 104. The input and output interface 105 is also connected to an input unit 106 including a keyboard and a mouse and an output unit 107 including a display and a speaker. The bus 104 is also connected to a memory unit 108 including a hard disk or a nonvolatile memory, a communication unit 109 including a network interface, and a drive 110 driving a removable medium 111.

In the computer having the above-mentioned configuration, the above-mentioned series of processes are performed by causing the CPU 101 to load, for example, a program stored in the memory unit 108 to the RAM 103 via the input and output interface 105 and the bus 104 and to execute the program.

The program executed by the CPU 101 is recorded on a removable medium 111 or provided via wired or wireless mediums such as a LAN, the Internet, and a digital broadcast and is then installed in the memory unit 108.

The program executed by the computer may be a program of which processes are carried out in time series in the sequence described in this specification or may be a program of which processes are carried out in parallel or at a necessary time such as a calling time.

The present application contains subject matter related to that disclosed in Japanese Priority Patent Application JP 2009-73142 filed in the Japan Patent Office on Mar. 25, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a detection unit for analyzing a captured image to acquire information on a position of at least one of a face and a body of each character included as a subject;
   a determination unit for determining whether each character included as the subject in the captured image is an unnoted non-main character, wherein the determination unit determines that a character being absent for a predetermined time from a plurality of images continuously captured is the non-main character on the basis of the information on the position acquired by the detection unit from the plurality of images continuously captured; and
   a control unit for controlling an image-related process which is a process related to an image on the basis of a status of the character determined as a non-main character, wherein controlling the image-related process includes:
   lowering sharpness of at least a part of the character in the captured image, responsive to determining that the character is the non-main character.

2. The image processing device according to claim 1, further comprising:
   an image capturing unit for capturing an image,
   wherein the determination unit determines whether each character included as the subject in the image captured by the image capturing unit is an unnoted non-main character, and
   wherein the control unit controls a process of capturing an image to be recorded, which is performed as the image-related process by the image capturing unit.

3. The image processing device according to claim 1, further comprising:
   an image capturing unit for capturing an image; and
   an image processing unit for processing the image captured by the image capturing unit,
   wherein the determination unit determines whether each character included as the subject in the image captured by the image capturing unit is an unnoted non-main character, and
   wherein the control unit controls a process of processing a part of the character determined as a non-main character included in the image captured by the image capturing unit, which is performed as the image-related process by the image processing unit.

4. The image processing device according to claim 1, further comprising:
a recording unit for recording the captured image,
wherein the determination unit determines whether each character included as a subject in the image recorded in the recording unit is an unnoted non-main character.

5. The image processing device according to claim 1, wherein the determination unit determines that a character included at a position other than a vicinity of a center of the image is the non-main character on the basis of the information on the position acquired by the detection unit.

6. The image processing device according to claim 5, wherein the determination unit determines that a character moving by a distance greater than a threshold value is the non-main character on the basis of the information on the position acquired by the detection unit from a plurality of images continuously captured.

7. The image processing device according to claim 1, further comprising:
a detection unit for analyzing the captured image to acquire information on a size of at least one of a face and a body of each character included as the subject,
wherein the determination unit determines that a character with a size smaller than a threshold value is the non-main character on the basis of the information on the size acquired by the detection unit.

8. The image processing device according to claim 1, further comprising:
a detection unit for analyzing the captured image to acquire information on a direction of at least one of a face and a body of each character included as the subject,
wherein the determination unit determines that a character of which a face or a body is not directed to an image capturing device for a predetermined time is the non-main character on the basis of the information on the direction acquired by the detection unit from a plurality of images continuously captured.

9. The image processing device according to claim 1, further comprising:
a detection unit for analyzing the captured image to acquire a face of each character included as the subject; and
a recognition unit for recognizing whether the expression of the face detected by the detection unit is a smile,
wherein the determination unit determines that a character which does not hold the smile continuously for a predetermined time is the non-main character on the basis of the recognition result of the recognition unit from a plurality of images continuously captured.

10. The image processing device according to claim 1, further comprising:
a recording unit for recording face images; and
a detection unit for analyzing the captured image to acquire a face image of each character included as the subject,
wherein the determination unit determines that a character of which the face image is not recorded in the recording unit out of the characters included in the subject is the non-main character.

11. The image processing device according to claim 1, further comprising:
a recording controller unit for compressing the captured image,
wherein the recording controller unit stores the compressed captured image in a memory device.

12. A computer-implemented image processing method performed by an image processing device comprising:
analyzing, by a detection unit of the image processing device, a captured image to acquire information on a position of at least one of a face and a body of each character included as a subject;
determining, by a determining unit of the image processing device, whether each character included as the subject in the captured image is an unnoted non-main character, wherein the determination unit determines that a character being absent for a predetermined time from a plurality of images continuously captured is the non-main character on the basis of the information on the position acquired by the detection unit from the plurality of images continuously captured; and
controlling, by a controlling unit of the image processing device, an image-related process which is a process related to an image on the basis of a status of the character determined as a non-main character, wherein controlling the image-related process includes:
lowering sharpness of at least a part of the character in the captured image, responsive to determining that the character is the non-main character.

13. A computer program product, tangibly embodied on a non-transitory computer-readable medium that, when executed, causes a computing device to perform an image processing method comprising:
analyzing, by a detection unit of the computing device, a captured image to acquire information on a position of at least one of a face and a body of each character included as a subject;
determining, by a determining unit of the computing device, whether each character included as the subject in the captured image is an unnoted non-main character, wherein the determination unit determines that a character being absent for a predetermined time from a plurality of images continuously captured is the non-main character on the basis of the information on the position acquired by the detection unit from the plurality of images continuously captured; and
controlling, by a controlling unit of the computing device, an image-related process which is a process related to an image on the basis of a status of the character determined as a non-main character, wherein controlling the image-related process includes:
lowering sharpness of at least a part of the character in the captured image, responsive to determining that the character is the non-main character.

14. An image processing device comprising:
a detection unit for analyzing a captured image to acquire information on a position of at least one of a face and a body of each character included as a subject;
a determination unit configured to determine whether each character included as the subject in the captured image is an unnoted non-main character, wherein the determination unit determines that a character being absent for a predetermined time from a plurality of images continuously captured is the non-main character on the basis of the information on the position acquired by the detection unit from the plurality of images continuously captured; and
a controller configured to control an image-related process which is a process related to an image on the basis of a status of the character determined as a non-main character, wherein controlling the image-related process includes:

lowering sharpness of at least a part of the character in the captured image, responsive to determining that the character is the non-main character.

* * * * *